US012194768B2

(12) United States Patent
Tziovaras et al.

(10) Patent No.: US 12,194,768 B2
(45) Date of Patent: Jan. 14, 2025

(54) LAYER STRUCTURE WITH ENGRAVING AS VISIBLE SECURITY ELEMENT

(71) Applicant: Covestro Deutschland AG, Leverkusen (DE)

(72) Inventors: Georgios Tziovaras, Neuss (DE); Helge Kosthorst, Visselhovede (DE); Heinz Pudleiner, Krefeld (DE); Theivanayagam Deivaraj, Dusseldorf (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 18/248,530

(22) PCT Filed: Oct. 19, 2021

(86) PCT No.: PCT/EP2021/078876
§ 371 (c)(1),
(2) Date: Apr. 11, 2023

(87) PCT Pub. No.: WO2022/089986
PCT Pub. Date: May 5, 2022

(65) Prior Publication Data

US 2023/0406025 A1 Dec. 21, 2023

(30) Foreign Application Priority Data

Oct. 26, 2020 (EP) .................................... 20203778

(51) Int. Cl.
*B42D 25/24* (2014.01)
*B42D 25/30* (2014.01)
(Continued)

(52) U.S. Cl.
CPC ............ *B42D 25/24* (2014.10); *B42D 25/36* (2014.10); *B42D 25/41* (2014.10)

(58) Field of Classification Search
CPC ........ B42D 25/24; B42D 25/36; B42D 25/41; B42D 25/351; B42D 25/455; B42D 25/46
See application file for complete search history.

(56) References Cited

U.S. PATENT DOCUMENTS

| | | | |
|---|---|---|---|
| 3,023,192 | A | 2/1962 | Shivers, Jr. |
| 3,485,787 | A | 12/1969 | Haefele et al. |

(Continued)

FOREIGN PATENT DOCUMENTS

| | | | | |
|---|---|---|---|---|
| CA | 2857335 | A1 * | 6/2013 | ............. B42D 25/21 |
| DE | 2901774 | A1 | 7/1980 | |

(Continued)

OTHER PUBLICATIONS

DE 102016212106A1—Self-healing surface protection film with acrylate-functional top coat, 18 pages. (Year: 2024).*
(Continued)

*Primary Examiner* — Tuyen K Vo
(74) *Attorney, Agent, or Firm* — John E. Mrozinski, Jr.

(57) ABSTRACT

Provided is a layer structure, preferably a security form in a book cover, particularly preferably a security form in a book cover for identification or security documents, comprising at least a) a first radiation-engravable layer a) containing at least one polymeric material; and b) at least one further layer b) containing at least one polymeric material, preferably a thermoplastic elastomer, preferably a thermoplastic polyurethane with a hardness of ≥40 Shore A according to DIN ISO 7619-1-2012-2 to ≤95 Shore D according to DIN ISO 7619-1-2012-2; wherein the further layer b) overlies the first layer a) at least partly to form an overlapping region, and wherein a coherent engraving partly extends in the overlap region, preferably in the further layer b), and partly in the portion of layer a) that extends outside the overlap region, most preferably exclusively in the further layer b). The invention also relates to a method for producing this layer
(Continued)

structure and to a laminate comprising such a layer structure and to the use of the layer structure in a security document.

13 Claims, 2 Drawing Sheets

(51) Int. Cl.

| | |
|---|---|
| ***B42D 25/328*** | (2014.01) |
| ***B42D 25/36*** | (2014.01) |
| ***B42D 25/41*** | (2014.01) |

(56) References Cited

U.S. PATENT DOCUMENTS

| | | | |
|---|---|---|---|
| 3,766,146 | A | 10/1973 | Witsiepe |
| 3,823,031 | A | 7/1974 | Tsukamoto et al. |
| 4,006,116 | A | 2/1977 | Dominguez |
| 4,039,629 | A | 8/1977 | Himes et al. |
| 4,169,867 | A | 10/1979 | Burg et al. |
| 4,207,410 | A | 6/1980 | Burzin et al. |
| 4,218,549 | A | 8/1980 | Jadamus et al. |
| 4,238,582 | A | 12/1980 | Deleens et al. |
| 4,252,920 | A | 2/1981 | Deleens et al. |
| 4,332,920 | A | 6/1982 | Foy et al. |
| 4,438,240 | A | 3/1984 | Tanaka et al. |
| 7,771,646 | B2 | 8/2010 | Clauss et al. |
| 8,980,135 | B2 | 3/2015 | Takeda et al. |
| 9,224,085 | B2 | 12/2015 | Ghisa et al. |
| 11,311,904 | B2 | 4/2022 | Tziovaras et al. |
| 2014/0265301 | A1 | 9/2014 | Haas et al. |
| 2020/0048043 | A1 * | 2/2020 | Zhao ........................ D07B 1/16 |

FOREIGN PATENT DOCUMENTS

| | | | | |
|---|---|---|---|---|
| DE | 102016212106 | A1 * | 1/2018 | ....... B29D 11/00865 |
| EP | 3363617 | A1 * | 8/2018 | |
| JP | 2008214596 | A | 9/2008 | |
| WO | 2004050766 | A1 | 6/2004 | |
| WO | 2004050767 | A1 | 6/2004 | |
| WO | 2016177681 | A1 | 11/2016 | |

OTHER PUBLICATIONS

Description WO2016177681A1—Data carrier for insertion into a notebook or book-shaped object and method for producing the same, 27 pages. (Year: 2024).*

CN 112694589A—Polyurethane polymer with hardness less than or equal to 60 Shore A, 16 pages. (Year: 2024).*

DE 102019124760A1—Vessel closure with sealing element, 14 pages. (Year: 2024).*

Houben-Weyl "Methoden der organischen Chemie" [Methods of Organic Chemistry], vol. E20 "Makromolekulare Stoffe" [Macromolecular Materials], Georg Thieme Verlag, Stuttgart, New York 1987, pp. 1587-1593.

Justus Liebigs Annalen der Chemie, 562, 1959, pp. 75 to 136.

Adachi et al., J. Am. Ceram. Soc. 2008, 91, pp. 2897-2902.

Adachi et al. J. Am. Ceram. Soc. 2007, 90, pp. 4059-4061.

International Search Report, PCT/EP2021/078876, date of mailing: Jan. 25, 2022, Authorized officer: Didier Achermann.

* cited by examiner

LAYER STRUCTURE WITH ENGRAVING AS VISIBLE SECURITY ELEMENT

CROSS REFERENCE TO RELATED APPLICATIONS

This application is a national stage application under 35 U.S.C. § 371 of PCT/EP2021/078876, filed Oct. 19, 2021, which claims benefit of EP Application No. 20203778.4, filed Oct. 26, 2020, both of which are incorporated herein by reference in their entireties.

FIELD OF THE INVENTION

The invention relates to a layer structure with an engraving that extends over an overlap region of a layer a) and a further layer b).

BACKGROUND OF THE INVENTION

Plastic-based security documents and/or documents of value, especially identification documents, for example ID cards, are nowadays preferably produced without the use of adhesive layers as multilayer composites by means of lamination at high temperatures and high pressure, in order to prevent subsequent separation of the layer structures for exchange of identification features. The corresponding security features are incorporated into these multilayer composites before or during the lamination process, and these must consequently be configured such that they withstand the lamination process parameters without destruction. Moreover, the security features must not introduce any weak points into the multilayer composite that enable nondestructive subsequent opening of the composite again. Of particular interest are security features that can be incorporated after the lamination process or into the finished ID document and, in the case of a forgery, can easily be identified as such. Ideally, it should still be possible to connect the security feature to the document holder's data or to personalize it or make it forgeryproof in some other way.

Security features in security documents and/or documents of value are typically divided into three security levels:

- Level 1 security features are those that are perceptible purely visually by the naked eye without use of additional aids.
- Level 2 security features are those that require aids (for example a magnifying glass, an optical filter, a reader etc.) to become visible.
- Level 3 security features are those that can be identified only in a laboratory by forensic methods.

In general, the analysis is associated with at least partial destruction of the document. There is therefore an increased need for level 1 security features that can quickly be perceived, preferably by visual or tactile means, preferably include personal data of the document holder and, in the event of a forgery, can be perceived as such quickly and without aids or with few aids. Security features are also called personalized security features hereinafter.

In the case of ID documents made of polymeric materials such as plastic, especially of polycarbonate, the most important personalized security feature is the photo of the document holder. The reason for that is that it can be incorporated into the document after the blank document has been completed by means of laser engraving, for example as a black-and-white photo. In order to improve the forgery-proofing of laser-engraved photos, methods that enable laser engraving of the photo in color have been developed, as described in European patent application with application number EP 3 613 602 A1. Apart from laser engraving in color, this method enables provision of the photo with partial structuring in order to be able to distinguish it more easily from a forgery. In this way, for example, it is possible to engrave some regions of the photo with more intense laser radiation in order thus to be able to produce additional structuring. With a great deal of effort, however, forgers are also able to create a structure on the photo, for example by partial application of a transparent lacquer.

A popular security feature in ID documents made of polycarbonate is transparent windows. The improvement in proof against forgeries is that the transparency of the window is destroyed in an attempt to commit forgery. The destruction of the transparency occurs, for example, when a transparent film is stuck over an ID document, or when the document is split by mechanical means. In some cases, in transparent windows, a laser is used to engrave the photo or other person-specific information of the document holder in order to make an attempted forgery harder. One variant of this is described in WO 2014/151377 A2.

In the production of travel passport books, especially of passport books with a data sheet, in the form of a security form, for example made of polycarbonate, there is a need for a forgeryproof connection of the data sheet to the passport book or to the passport book cover, i.e. the remainder of the travel passport.

A reliable connection, especially a forgeryproof connection, of the data sheet, also called security form, to the passport book via the passport tab is found to be complicated and costly from a manufacturing point of view.

There is therefore a need to further improve the method of reliable connection of the data sheet in travel passports, for example in the form of laser engraving or welding, to counter forgery, or to make at least parts of security documents as forgeryproof as possible.

BRIEF DESCRIPTION OF THE FIGURES

The present invention will now be described for purposes of illustration and not limitation in conjunction with the figures, wherein.

Figure 5:
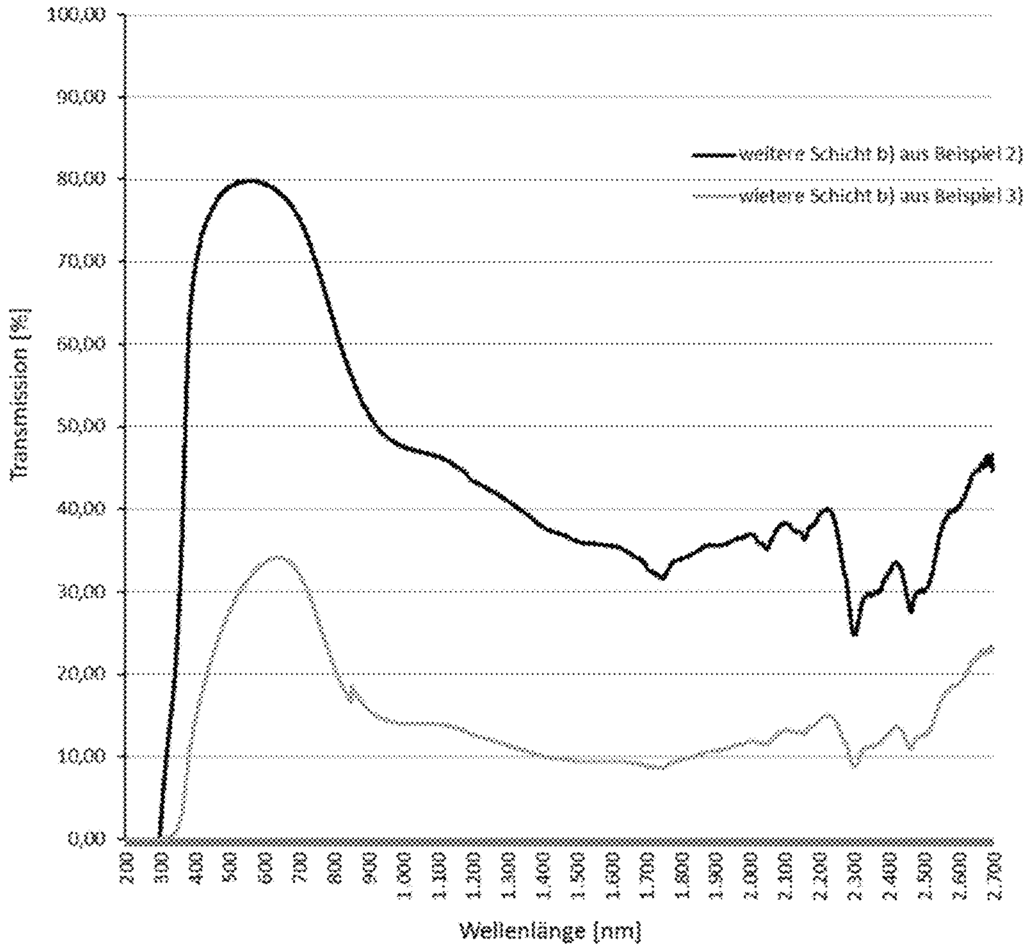
Figure 6:
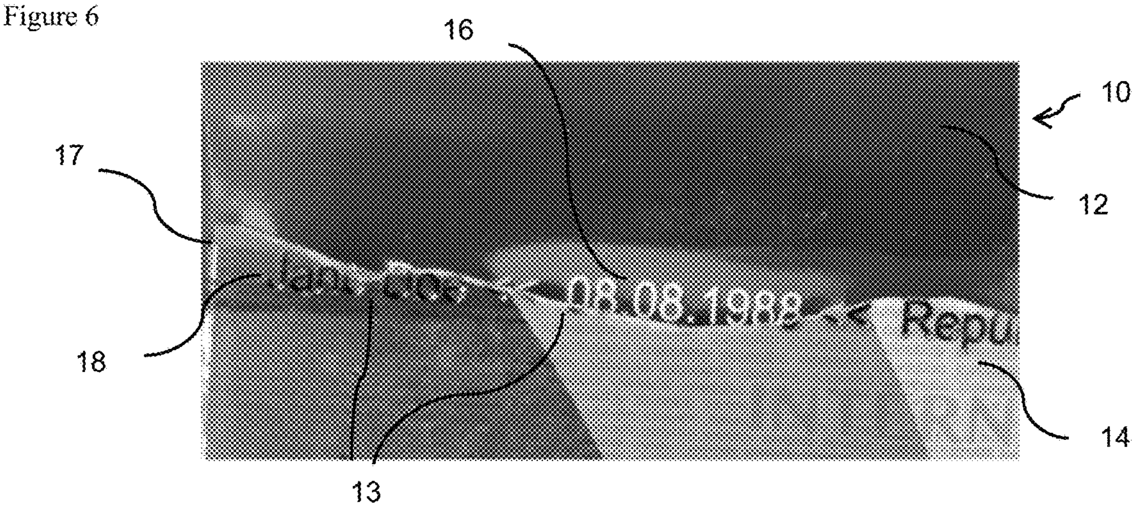

FIG. **4*a*** is a schematic diagram of the method of producing a layer structure of the invention with join zone;

FIG. **4*b*** is a schematic diagram of the method of producing a multilayer laminate comprising the layer structure of the invention;

FIG. 5 is a diagram of the transmittance values of two further layers b) from examples 2) and 3) with different proportions of IR absorber in the wavelength range of 200 to 2700 nm.; and FIG. 6 shows a layer structure 10 of the invention in the form of a travel passport.

DETAILED DESCRIPTION OF THE INVENTION

It was therefore an object of the invention to provide a layer structure with improved forgeryproof elements, especially forgeryproof engraving, in the layer structure, and to provide a forgeryproof security document manufactured therefrom. In particular, it was an object of the invention to provide a forgeryproof hinge, i.e. a forgeryproof connection between a data sheet, for example in the form of a security form, and a passport tab of a travel passport. A further object was that of providing a method of producing a forgeryproof layer structure, or a forgeryproof security document produced by means of the method.

At least one of the objects was surprisingly achieved by a first item of subject matter of the invention, which relates to a layer structure, preferably a hinge, more preferably a hinge formed between a security form and a book cover, for example via a tab, most preferably a hinge formed between a security form and a book cover of an identification or security document, for example a travel passport, comprising at least a) a first radiation-engravable layer a) comprising at least one polymeric material; and b) at least one further letter b) comprising at least one polymeric material, preferably a thermoplastic elastomer, preferably a thermoplastic polyurethane having a Shore A hardness of ≥40 up to a Shore D hardness of ≤95, preferably ≥45 Shore A to ≤90 Shore D, more preferably ≥50 Shore A to ≤85 Shore D, especially preferably ≥55 Shore A to ≤80 Shore D, where Shore hardness is ascertained to DIN ISO 7619-1-2012-2;

wherein the further layer b) partly covers the first layer a) to form an overlap region, and wherein a coherent engraving partly in the overlap region, preferably in the further layer b), most preferably exclusively in the further layer b), and partly in the portion of layer a) that extends outside the overlap region.

The layer structure may be any structure that the person skilled in the art would choose as layer structure, especially as hinge, more preferably as hinge, for example as tab, between a security form and a book cover, most preferably as hinge between a security form and a book cover for identification or security documents. A hinge is preferably understood to mean a connection, especially a flexible connection, between two or more parts that constitute identification or security documents such as travel passports or birth certificates. If it is a hinge between a security form and a book cover, layer b) represents the tab and layer a) the security form.

By virtue of the coherent engraving incorporated by means of laser engraving, for example, both in the overlap region and in the region atop the first layer a) that adjoins the overlap region, it is possible to configure the connection of the data sheet, in the form of the first layer a), to the passport book, for example via a tab, in the form of the further layer b) in an individual and forgeryproof manner. For example, the engraving may be provided with the personal data of the passport book holder.

In one possible design of the travel passport in which the data page may be connected to further pages of the passport book, as in EP 2433810, for example, the connection of these pages may be personalized by the introduction of the coherent engraving, for example in that it contains personal data of the passport holder. This is likewise possible in the case of visa forms that have been stuck in or other passport book entries.

The layer structure preferably takes the form of a hinge. The layer structure more preferably takes the form of a hinge, in the form of a tab, between a security form and a book cover. In particular, it is the book cover of an identification or security document, such as travel passports or birth certificates. However, reference is made hereinafter merely to a layer structure if it can be configured as a hinge or as a hinge between a security form and a book cover. All the properties and constituents of the layer structure mentioned hereinafter are consequently also applicable to a hinge or to a hinge between a security form and a book cover.

According to the invention, a security form refers to the part of a security document, as in a travel passport or personal ID, that contains personal data. Such security forms are referred to as data pages and are preferably connected via a tab to the book cover of the identification or security document. The tab is preferably sewn and/or adhesive-bonded to the book cover.

The layer structure preferably has a two-dimensional extent. The area of the layer structure is preferably within a range from 1 $cm^2$ to 1 $m^2$, further preferably within a range from 5 $cm^2$ to 0.8 $m^2$, more preferably within a range from 10 $cm^2$ to 0.5 $m^2$, most preferably within a range from 50 $cm^2$ to 0.1 $m^2$. The layer structure preferably has a thickness within a range from 0.1 to 5 cm, more preferably within a range from 0.2 to 2 cm, most preferably within a range from 0.5 to 1 cm.

The first layer a) may be any radiation-engravable layer including a polymeric material. The first layer a) is preferably composed of a transparent radiation-engravable polymeric material. The first layer a) is preferably transparent and clear. What is meant by "transparent" according to the invention is that the layer is at least partly transparent to light within a wavelength range from 400 to 700 nm. The first layer a), and further preferably the further layer b) as well, preferably consists of a polymeric material having a transparency to radiation, also called transmittance, for the chosen radiation within the wavelength range from 400 to 700 nm of ≥10% to ≤99.95%, preferably of ≥30% to ≤95%, more preferably ≥40% to ≤93%, determined by means of UV-VIS-NIR-MIR as described in the methods section.

The layer structure, especially the first layer a) is preferably clear prior to the treatment with a laser. "Clear" in the context of the application means that the layer structure or first layer a) has a haze of ≤20%, preferably of ≤15%, more preferably of ≤10%, especially preferably ≤5%, measured in accordance with standard ASTM D1003:2013.

If the layer structure takes the form of a hinge, especially a hinge, preferably in the form of a tab, between a security form and a book cover, the first layer a) forms the security form and the further layer b) the tab.

The first layer a), and especially also the further layer b), may consist of a single film or a composite of at least two films.

The polymeric material of the first layer a) may be the same as the material of the further layer b). Alternatively, the polymeric material of the first layer a) is different than the polymeric material of the further layer b). The material of the first layer a) may be harder or softer than the material of the further layer b), it being preferable that the material of the first layer a) is harder than the material of the further layer b). The polymeric material of the first layer a) preferably has a modulus of elasticity within a range from 1500 to 2500 MPa, further preferably from 1700 to 2200 MPa. The polymeric material of the further layer b) preferably has a modulus of elasticity within a range from 10 to 150 MPa, further preferably from 20 to 130 MPa.

At least one of the at least one films of the first layer a) or of the further layer b) preferably includes at least one polymeric material selected from the group consisting of a polycarbonate, a copolycarbonate, a polyester, a copolyester or mixtures of at least two of these. The first layer a) and especially also the further layer b) may include or consist of a thermoplastic material, especially a thermoplastic elastomer.

The polycarbonate or the copolycarbonate may be any polycarbonate or copolycarbonate that the person skilled in the art would select for production of the first layer a) or the further layer b), but more preferably the first layer a) of the layer composite. Particularly suitable polycarbonates that are present with preference in layer a) and preferably also in layer b) are preferably thermoplastic aromatic polycarbonates of high molecular weight with $M_w$ (weight-average molecular weight ascertained by gel permeation chromatography versus polystyrene standard in tetrahydrofuran at 23° C. after prior calibration) of at least 10 000 g/mol, preferably of 20 000 to 300 000 g/mol, which contain bifunctional carbonate structural units of the formula (I)

(I)

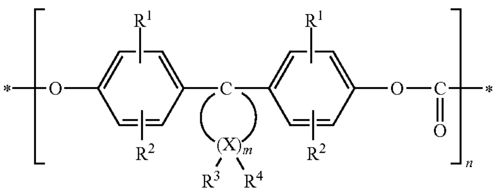

in which $R^1$ and $R^2$ are independently hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, especially benzyl, m is an integer from 4 to 7, preferably 4 or 5, $R^3$ and $R^4$ can be chosen individually for each X and are independently hydrogen or $C_1$-$C_6$-alkyl and X is carbon, with the proviso that, on at least one atom X, $R^3$ and $R^4$ are both alkyl.

Particularly suitable thermoplastic polymers or thermoplastics are selected from the group consisting of one or more polycarbonates or copolycarbonates based on diphenols, for example as described above, poly- or copolyacrylate(s) and poly- or copolymethacrylate(s) such as, by way of example and with preference, polymethylmethacrylate or poly(meth)acrylate (PMMA), polymer(s) or copolymer(s) with styrene such as, by way of example and with preference, polystyrene (PS), acrylonitrile-butadiene-styrene (ABS), or polystyrene-acrylonitrile (SAN), thermoplastic polyurethane(s) and also polyolefin(s) such as, by way of example and with preference, polypropylene types or polyolefins based on cyclic olefins (e.g. TOPAS®, Hoechst), poly- or copolycondensate(s) of terephthalic acid such as, by way of example and with preference, poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), polyamide (PA), poly- or copolycondensate(s) of naphthalenedicarboxylic acid such as, by way of example and with preference, polyethylene glycol naphthalate (PEN), poly- or copolycondensate(s) of at least one cycloalkyldicarboxylic acid such as, by way of example and with preference, polycyclohexanedimethanol-cyclohexanedicarboxylic acid (PCCD), polysulfones (PSU), mixtures of two of the above or blends of at least two of the above.

Thermoplastic elastomers are materials containing elastomeric phases in thermoplastically processible polymers in either physically mixed-in or chemically incorporated form. A distinction is made between polyblends in which the elastomeric phases are physically mixed in and block copolymers in which the elastomeric phases are part of the polymer skeleton. As a result of the structure of the thermoplastic elastomers, hard and soft regions are present next to each other. The hard regions form a crystalline network structure or a continuous phase the interstices of which are filled with elastomeric segments. Because of this structure, these materials have rubber-like properties.

The thermoplastic elastomer is preferably selected from the group consisting of a thermoplastic copolyamide (TPE-A), in particular a polyether block amide, a thermoplastic polyurethane (TPE-U), a thermoplastic polyester elastomer (TPE-E), a styrene block copolymer (TPE-S), TPE-V-vulcanized (crosslinked) PP/EPDM compounds, or a mixture of at least two of these.

The thermoplastic copolyamide (TPE-A) can be any copolyamide that a person skilled in the art would select for a layer structure, in particular polyether block amides (PEBAs). Preferred polyether block amides are, for example, those which consist of polymer chains formed from repeat units conforming to the formula (II)

(II)

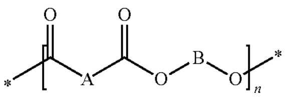

in which

A is the polyamide chain derived from a polyamide having 2 carboxyl end groups via the loss of the latter and B is the polyoxyalkylene glycol chain derived from a polyoxyalkylene glycol having terminal OH groups via the loss of the latter, and n is the number of units forming the polymer chain. The end groups here are preferably OH groups or moieties of compounds which terminate the polymerization.

The dicarboxylic polyamides having the terminal carboxyl groups are obtained in a known way, for example by polycondensation of one or more lactams or/and one or more amino acids, or also by polycondensation of a dicarboxylic acid with a diamine, in each case in the presence of an excess of an organic dicarboxylic acid preferably having terminal carboxyl groups. These carboxylic acids become part of the polyamide chain during the polycondensation and undergo addition in particular at the ends of this chain, as a result of which a polyamide having μ-dicarboxylic acid functionality is obtained. The dicarboxylic acid also acts as a chain terminator, which is why it is also used in excess.

The polyamide can be obtained proceeding from lactams and/or amino acids having a hydrocarbon chain consisting of 4-14 carbon atoms, for example from caprolactam, enantholactam, dodecalactam, undecanolactam, decanolactam, 11-aminoundecanoic or 12-aminododecanoic acid.

Examples of polyamides, as formed by the polycondensation of a dicarboxylic acid with a diamine, include the condensation products of hexamethylenediamine with adipic acid, azelaic acid, sebacic acid and 1,12-dodecanedioic acid, and the condensation products of nonamethylenediamine and adipic acid.

Useful dicarboxylic acids for the synthesis of the polyamide, i.e. firstly used for fixing one carboxyl group to each end of the polyamide chain and secondly as chain terminator, include those having 4-20 carbon atoms, in particular alkanedioic acids, such as succinic acid, adipic acid, suberic acid, azelaic acid, sebacic acid, undecanedioic acid or dodecanedioic acid, and additionally cycloaliphatic or aromatic dicarboxylic acids such as terephthalic acid or isophthalic acid or cyclohexane-1,4-dicarboxylic acid.

The polyoxyalkylene glycols having terminal OH groups are unbranched or branched and have an alkylene radical having at least 2 carbon atoms. In particular, these are polyoxyethylene glycol, polyoxypropylene glycol and polyoxytetramethylene glycol, and copolymers thereof.

The average molecular weight of these OH group-terminated polyoxyalkylene glycols can vary within a wide range; it is advantageously between 100 and 6000 g/mol, in particular between 200 and 3000 g/mol.

The proportion by weight of the polyoxyalkylene glycol, based on the total weight of the polyoxyalkylene glycol and dicarboxylic polyamide used to produce the PEBA polymer, is preferably 5-85% by weight, preferably 10-50% by weight.

Processes for synthesizing such PEBA polymers are known from FR Patent 7 418 913, DE-A 28 02 989, DE-A 28 37 687, DE-A 25 23 991, EP-A 095 893, DE-A 27 12 987 and DE-A 27 16 004.

Particularly suitable are those PABA polymers which, in contrast to those described above, have a random structure. To produce these polymers, a mixture of 1. one or more polyamide-forming compounds from the group of aminocarboxylic acids or lactams having at least 10 carbon atoms,
2. an α,ω-dihydroxypolyoxyalkylene glycol,
3. at least one organic dicarboxylic acid, in a 1:(2+3) weight ratio of between 30:70 and 98:2, where hydroxyl groups and carbonyl groups are present in equivalent amounts in (2+3), is heated in the presence of 2% to 30% by weight of water, based on the polyamide-forming compounds of group 1, under autogenous pressure, at temperatures of between 23° C. and 30° C., and is then treated further after removal of the water, with exclusion of oxygen, at standard pressure or at reduced pressure, at 250 to 280° C. Such preferably suitable PEBA polymers are described in DE-A 27 12 987, for example.

Preferred PEBA polymers are available, for example, under the trade names PEBAX, from Atochem, Pebax® 5010, Pebax® 5020, Pebax® 5030, Pebax® 5040, Pebax® 5070 from Arkema (Germany), Vestamid from Hüls AG, Grilamid from EMS-Chemie and Kellaflex from DSM.

The polyether block amides may also contain additives customary for polymers or plastics. Examples of typical additives include pigments, stabilizers, flow agents, lubricants and demolding agents.

Examples of thermoplastic copolyamides which may be mentioned include products such as Pebax® 5010, Pebax® 5020, Pebax® 5030, Pebax® 5040, Pebax® 5070 from Arkema (Germany). Examples of thermoplastic polyurethanes are given below.

The thermoplastic polyester elastomer (TPE-E) can be any polyester elastomer that a person skilled in the art would select for a layer structure; the polyester elastomers are preferably copolyesters. Suitable copolyesters (segmented polyester elastomers) are formed, for example, from a multitude of repeat short-chain ester units and long-chain ester units which are combined by ester bonds, where the short-chain ester units make up 15-65% by weight of the copolyester and have the formula (III-a):

(III-a)

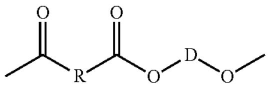

in which

R is a divalent dicarboxylic acid moiety having a molecular weight of ≤350 g/mol, D is a divalent organic diol moiety having a molecular weight of ≤250 g/mol;

the long-chain ester units make up 35-85% by weight of the copolyester, as per formula III-b (III-b)

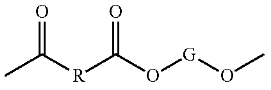

in which

R is a divalent dicarboxylic acid moiety having a molecular weight of ≤350 g/mol, G is a divalent long-chain glycol moiety having an average molecular weight of 350 to 6000 g/mol.

The preferred copolyesters are preparable by copolymerizing a) one or more dicarboxylic acids, b) one or more linear, long-chain glycols and c) one or more low molecular weight diols.

The dicarboxylic acids for the production of the copolyester are preferably aromatic acids having 8-16 carbon atoms, in particular phenylenedicarboxylic acids such as phthalic, terephthalic and isophthalic acid.

The low molecular weight diols for the reaction to form the short-chain ester units of the copolyesters preferably belong to the classes of the acyclic, alicyclic and aromatic dihydroxy compounds. The preferred diodes have 2-15 carbon atoms, such as ethylene, propylene, tetramethylene, isobutylene, pentamethylene, 2,2-dimethyltrimethylene, hexamethylene and decamethylene glycols, dihydroxycyclohexane, cyclohexanedimethanol, resorcinol, hydroquinone and the like. Bisphenols for the present purpose include bis(p-hydroxy)diphenyl, bis(p-hydroxyphenyl)methane, bis (p-hydroxyphenyl)ethane and bis(p-hydroxyphenyl)propane.

The long-chain glycols used to produce the soft segments of the copolyesters preferably have molecular weights of 600 to 3000 g/mol. These include poly(alkylene ether) glycols in which the alkylene groups have 2-9 carbon atoms. Glycol esters of poly(alkylene oxide)dicarboxylic acids or polyester glycols can also be used as long-chain glycol.

The long-chain glycols also include polyformals, which are obtained by reacting formaldehyde with glycols. Polythioether glycols are also suitable. Polybutadiene glycols and polyisoprene glycols, copolymers of the same, and saturated hydrogenation products of these materials are satisfactory long-chain polymeric glycols. Processes for synthesizing such copolyesters are known from DE-A 2 239 271, DE-A 2 213 128, DE-A 2 449 343 and US-A 3 023 192.

The polymeric material of the first layer a) or the polymeric material, especially the thermoplastic elastomer, of the further layer b) preferably also includes the additives that are customary for plastics. Examples of typical additives are lubricants, such as fatty acid esters, metal soaps thereof, fatty acid amides and silicone compounds, antiblocking agents, inhibitors, stabilizers against hydrolysis, light, heat and discoloration, flame retardants, dyes, pigments, inorganic or organic fillers, and reinforcers. Reinforcers are especially fibrous reinforcing materials, for example inorganic fibers which are produced according to the prior art and may also have been sized. Further details of the auxiliaries and additives mentioned can be found in the specialist literature, for example J. H. Saunders, K. C. Frisch: "High Polymers", volume XVI, Polyurethanes, parts 1 and 2, Interscience Publishers 1962 and 1964, R. Gächter, H. Müller (eds.): Taschenbuch der Kunststoff-Additive [Handbook of Plastics Additives], 3rd edition, Hanser Verlag, Munich 1989, or DE-A 29 01 774.

The radiation-engravable polymeric material is preferably variable in terms of its color by means of a laser in the presence of a dye. What is meant by "coloring variable by laser" according to the invention is that, in the polymeric material of the first layer a), in the case of an input of an energy of ≥1 watt in sustained radiation or ≥5 watts in pulsed radiation by laser, coloring with a dye is achievable, such that the resultant coloring is apparent to the naked eye. For the pulsed radiation, preference is given to using a pulse frequency within a range from 0.5 to 1000 kHz, preferably from 5 to 100 kHz, more preferably from 15 to 50 kHz. In this way, the engraving on the first layer a) may also have a colored configuration. The method of introducing a colored engraving is described in EP 3 613 602 A1.

What is meant by radiation-engravable first layer a) in the context of the invention is that the layer includes a material that interacts with light within a wavelength range of ≥0.1 to ≤1000 μm, preferably of ≥1.0 to ≤50 μm, more preferably of ≥1.0 to ≤2.5 μm, such that irradiation with light having sufficient energy in this wavelength range results in a change in color. This change in color may be caused either by radiation-sensitive materials that are present in the first layer a) and change color as a result of the irradiation within the abovementioned wavelength range, or in that the first layer a) is contacted with a colorant which, on irradiation of the first layer a) within the abovementioned wavelength range, penetrates into the first layer a) and hence causes a change in color of the first layer a).

Preferably, the layer structure in the first layer a) includes at least one additive having an absorption maximum in the wavelength range of the focused nonionizing electromagnetic radiation used. Alternatively, the first layer a) may be coated with at least one additive in the form of a coating composition having an absorption maximum within the wavelength range of focused nonionizing electromagnetic radiation. Details of the additives are given later in connection with other embodiments.

The first layer a) preferably has at least one, more preferably all, of the following properties:

(E1) a transparency to radiation of ≥2% to ≤99.95%, preferably of ≥4% to ≤90%, more preferably of ≥5% to ≤85%, for the chosen radiation, especially within a wavelength range of 950 to 1200 nm, preferably within a wavelength range of 1000 to 1150 nm, determined by UV-VIS-NIR-MIR as described in the methods section;

(E2) a thickness within a range from 0.01 to 20 mm, more preferably within a range from 0.02 to mm, even more preferably within a range from 0.05 to 5 mm, more preferably within a range from 0.1 to 1 mm.

Preferably, the first layer a) has the combination of properties selected from the group consisting of (E1); (E2); (E1) and (E2).

The layer thickness of layer a) may be achieved either by a single film of the corresponding layer thickness or by lamination of several thin films to give the layer a).

The further layer b) preferably has at least one, more preferably at least two and especially preferably all of the following properties:

(B1) a radiation transmittance of ≥2% to ≤99.95%, preferably of ≥4% to ≤90%, more preferably of ≥5% to ≤85%, for the chosen radiation, determined by UV-VIS-NIR-MIR as described in the methods section;

(B2) a thickness within a range from 0.05 to 10 mm, especially preferably within a range from 0.1 to 2 mm, very especially preferably within a range from 0.15 to 1 mm, more preferably within a range from 0.2 to 0.8 mm;

(B3) a transmittance, also called transparency to radiation, of light within a wavelength range from 950 to 1200 nm within a range from ≥0% to ≤50%, preferably from ≥1% to ≤40%, more preferably from ≥5% to ≤30%, most preferably from ≥7% to ≤20%, for the respectively selected radiation, determined by UV-VIS-NIR-MIR as described in the methods section;

(B4) an IR absorber having a transmittance of light of ≤20% within a wavelength range of 950 to 1200 nm.

Preferably, the further layer b) has the combination of properties selected from the group consisting of (B1); (B2); (B3); (B4); (B1) and (B2); (B1) and (B3); (B1) and (B4); (B2) and (B3); (B2) and (B4); (B3) and (B4); (B1) and (B2) and (B3); (B1) and (B2) and (B4); (B1) and (B3) and (B4); (B2) and (B3) and (B4); (B1) and (B2) and (B3) and (B4). Preferred IR absorbers for achievement of property (B3) or (B4) are described hereinafter.

The layer structure preferably has at least one, preferably at least two and more preferably all of the following properties:

(S1) a transparency to radiation of ≥2% to ≤99.95%, preferably of ≥4% to ≤90%, more preferably of ≥5% to ≤85%, for the chosen radiation, determined by UV-VIS-NIR-MIR as described in the methods section;

(S2) area within a range from 1 $cm^2$ to 1 $m^2$, further preferably from 5 $cm^2$ to 0.8 $m^2$, more preferably from 10 $cm^2$ to 0.5 $m^2$, most preferably from 50 $cm^2$ to 0.1 $m^2$;

(S3) a thickness within a range from 0.1 mm to 2 cm, especially preferably within a range from 0.2 mm to 1.5 cm, very especially preferably within a range from 0.5 mm to 1 cm, even more preferably within a range from 1 mm to 0.5 cm;

(S4) exactly one first layer a) and one further layer b).

Preferably, the layer structure has the combination of properties selected from the group consisting of (S1); (S2); (S3); (S4); (S1) and (S2); (S1) and (S3); (S1) and (S4); (S2) and (S3); (S2) and (S4); (S3) and (S4); (S1) and (S2) and (S3); (S1) and (S2) and (S4); (S1) and (S3) and (S4); (S2) and (S3) and (S4); (S1) and (S2) and (S3) and (S4).

According to the invention, the further layer b) partly covers the first layer a) to form an overlap region. It is possible here for a step from the further layer b) to the first layer a) to be formed. A coherent engraving extends partly over the layer a) outside the overlap region. This part of the engraving is referred to hereinafter as first part-engraving. The other part of the coherent engraving within the range of overlap is referred to hereinafter as further part-engraving. This further part-engraving is preferably incorporated exclusively into the further layer b). If a step has formed, the step preferably has an extent corresponding to the thickness of the further layer b) ±10%. The step preferably has an extent within a range from 1 to 1000 μm, more preferably from 2 to 500 μm, especially preferably from 10 to 100 μm.

The overlap region is the region of the layer structure in which a portion of the area of the first layer a) is covered by a portion of the area of the further layer b). The overlap region preferably extends over an overlap region of the first layer a) within a range from 1% to 90%, further preferably within a range from 2% to 80%, especially preferably within a range from 3% to 70%, very especially preferably within a range from 4% to 60%, more preferably within a range from 5% to 30%, based on the area of one side of the first layer a). The further layer b) covers the first layer a) preferably over the complete extent of the further layer b). Preferably, the further layer b) covers the first layer a) within a range from 10% to 90%, further preferably within a range from 20% to 80%, especially preferably within a range from 30% to 70%, most preferably within a range from 40% to 60%, based on the area of one side of the first layer b). The further layer b) preferably extends beyond the first layer a) outside the overlap region, especially within a range from 20% to 60%, based on the area of one side of the first layer a).

The overlap region preferably extends over the entire length of the further layer b) and preferably also the entire length of the first layer a). The overlap region preferably has a length within a range from 1 to 1000 mm, more preferably from 2 to 500 mm, especially preferably from 5 to 200 mm, most preferably from 10 to 100 mm. The overlap region preferably has a length within a range from 0.1 to 1000 mm, more preferably from 1 to 500 mm, especially preferably from 5 to 200 mm, most preferably from 10 to 100 mm.

The engraving within the overlap region at least in part of the further layer b) and on part of the first layer a) outside the overlap region may be any engraving that the person skilled in the art would select for the purpose. The engraving is preferably a laser engraving.

The engraving, preferably in the overlap region, preferably both for the first part-engraving and for the further part-engraving, has a width within a range from 0.005 to 5 mm, further preferably within a range from 0.01 to 1 mm, more preferably within a range from 0.02 to 0.1 mm. The engraving within the portion of the layer structure consisting exclusively of the first layer a), i.e. the first part-engraving, preferably has a width within a range from 0.005 to 5 mm, further preferably within a range from 0.01 to 1 mm, more preferably within a range from 0.02 to 0.1 mm. The engraving preferably extends over the entire length of the overlap region. The engraving preferably extends over an area in the range from 0.1 to 100 $cm^2$, more preferably from 1 to 80 $cm^2$, most preferably from 5 to 50 $cm^2$, of the layer structure.

According to the configuration of the overlap region, it ends at least at one point, preferably on two sides, or preferably on all sides of the overlap region, in a step that may have a maximum of the thickness of the further layer b). However, the two layers, the first layer a) and the further layer b), may also be joined to one another such that there is no resultant step in the transition of the overlap region to the first layer a) outside the overlap region, and instead a continuous transition is ensured from the first layer a) to the further layer b) in the overlap region. Particularly without a step, the coherent engraving appears to be continuous.

The first layer a) extends beyond the overlap region at least at one point. The overlap extends from the further layer b) within the overlap region, optionally beyond the step, preferably continuously to the first layer a). What is meant by coherent or continuous in the context of the invention is that at least part of the engraving within the overlap region at least on the further layer b) merges continuously into the part of the engraving on the first layer a) that extends beyond the overlap region. This continuous transition of the engraving from the overlap region on the first layer a) outside the overlap region is preferably formed without any offset between the two regions. This means that no offset at all in the engraving is apparent to the naked eye.

The part of the engraving within the overlap region on the further layer b) covers the further layer b) at least partly within a range from 0.1 mm to 1 cm, further preferably within a range from 0.2 mm to 0.5 cm, especially preferably within a range from 0.5 mm to 0.1 cm, based on the extent of the overlap region following on from the first layer a) outside the overlap region. The part of the engraving outside the overlap region on the first layer a) preferably has a range from 0.1 mm to 1 cm, further preferably a range from 0.2 mm to 0.5 cm, especially preferably a range from 0.5 mm to 0.1 cm, based on the distance on the first layer a) with regard to the overlap region.

The coherent engraving preferably takes the form of an inscription or of a number with one or more figures or a combination thereof. The continuous engraving is preferably configured in the form of personal data selected from the group consisting of name, date of birth, travel passport number and other personal data, or a combination of at least two of these. As well as the engraving present beyond the step from the overlap region onto the first layer a), there are also further engravings either on the further layer b) or the first layer a).

The overlap region may assume any shape or configuration that the person skilled in the art would select for the purpose. The overlap region preferably has a shape selected from the group consisting of a circle, an ellipse, a square, a rectangle, an irregular polygon, a regular polygon or a combination of at least two of these. The overlap region preferably has a rectangular shape.

The overlap region is preferably disposed on the first layer a) such that it is adjacent to the first layer a) or surrounded by the first layer a) to an extent of ≥20%, more preferably to an extent of ≥50%, especially preferably to an extent of ≥80%, most preferably to an extent of 100%.

On account of the different structure of the layer structure in the overlap region and in the part of the layer structure formed exclusively from the first layer a), the engraving in the overlap region may assume a different shape than on the first layer a) outside the overlap region. The engraving in the overlap region may either be incorporated solely in the further layer b) or incorporated both into a portion of the first layer a) and into a portion of the further layer b). The engraving in the overlap region is preferably incorporated solely into a portion of the further layer b).

The engraving in the overlap region preferably has a different form than the engraving on the first layer a). The different form is preferably selected from the group consisting of a different color, a different thickness and a different intensity or a combination of at least two of these. The color of the engraving is preferably white or milky in the overlap region, and black in the region on the first layer a) outside the overlap region.

The engraving in the layer structure in the region of the first layer a) outside the overlap region preferably has at least one, preferably at least two and more preferably all of the following properties:

Ga)1. a depth within a range from 10% to 100%, more preferably from 20% to 95%, especially preferably from 30% to 90%, most preferably from 50% to 80%, based on the thickness of the first layer a);

Ga)2. a depth within a range from 0.001 to 2 mm, more preferably within a range from 0.002 to 1.5 mm, even more preferably within a range from 0.005 to 1 mm, even more preferably within a range from 0.005 to 0.5 mm.

Ga)3. a part-engraving in the first layer a) outside the overlap region that differs in color from the part-engraving in the adjoining further layer b).

Preferably, the engraving in the layer structure in the region of the first layer a) outside the overlap region has the combination of properties selected from the group consisting of Ga)1.; Ga)2.; Ga)3.; Ga)1. and Ga)2.; Ga)1. and Ga)3.; Ga)2. and Ga)3.; Ga)1. and Ga)2. and Ga)3.

Preferably, the part-engraving in the first layer a) outside the overlap region is lighter in color than the engraving in layer b), specifically by at least 2 units in the L value, measured according to Cielab DIN 5033-3:1992-07.

The engraving in the layer structure in the region of the overlap region preferably has at least one, preferably at least two, more preferably at least three, in any combination, and more preferably all of the following properties:

Gb)1. a depth within a range from 10% to 100%, more preferably from 20% to 95%, especially preferably from 30% to 90%, most preferably from 50% to 80%, based on the thickness of the further layer b);

Gb)2. a depth within a range from 5% to 100%, more preferably from 10% to 95%, especially preferably from 30% to 90%, most preferably from 50% to 80%, based on the thickness of the layer structure;

Gb)3. a depth within a range from 0% to 80%, more preferably from 10% to 70%, especially preferably from 20% to 60%, most preferably from 30% to 50%, based on the thickness of the first layer a);

Gb)4. a depth within a range from 0.001 to 1 mm, more preferably within a range from 0.002 to 0.5 mm, even more preferably within a range from 0.005 to 0.01 mm, even more preferably within a range from 1 mm to 0.5 cm.

Preferably, the engraving in the layer structure in the region of the overlap region has the combination of properties selected from the group consisting of Gb)1.; Gb)2.; Gb)3.; Gb)4.; Gb)1. and Gb)2.; Gb)1. and Gb)3.; Gb)1. and Gb)4.; Gb)2. and Gb)3.; Gb)2. and Gb)4.; Gb)3. and Gb)4.; Gb)1. and Gb)2. and Gb3); Gb)1. and Gb)2. and Gb)4.; Gb)1. and Gb)3. and Gb)4.; Gb)2. and Gb)3. and Gb)4.; Gb)1. and Gb)2. and Gb)3. and Gb)4.

As well as the layers of the first layer a) and the at least one further layer b), the layer structure may comprise at least one further layer c). The first layer a) is preferably directly adjacent to one of the further layers b). Further layers b) and further layers c) are preferably present symmetrically on either side of the first layers a) and a further layer b) that are adjacent in the layer structure. The further layer c) differs from the further layers b) at least in one material component.

The at least one further layer b) may consist of a single film or a composite of at least two films. Preferably, at least one of the films includes at least one thermoplastic elastomer, most preferably at least two or all films. The film in layer b) which contains the thermoplastic elastomer is preferably the outermost film in the layer structure.

The thermoplastic elastomer is preferably selected from the group consisting of a thermoplastic copolyamide (TPE-A), in particular a polyether block amide, a thermoplastic polyurethane (TPE-U), a thermoplastic polyester elastomer (TPE-E), a styrene block copolymer (TPE-S), TPE-V-vulcanized (crosslinked) PP/EPDM compounds, or a mixture of at least two of these. The preferred thermoplastic elastomers have been described above in connection with the first layer a). All observations relating to these thermoplastic elastomers are especially also applicable to the further layer b) and also to any at least one further layer c). The polymeric materials and other constituents of layers a) and of layer b) are preferably different, but they may also be identical. Thus, in a preferred embodiment, layer a) in the selection of polymeric materials may be identical to layer b). But layers a) and b) preferably have a different thickness. Thus, it is preferable that the further layer b) is configured to be thinner than layer a). This is for the particular reason that the further layer b) should be configured to be particularly flexible in order, for example, in the form of a tab, to firstly be sewn to a book cover and secondly, together with the book cover, also to be able to participate at least partly in the bending of the book cover without tearing or preventing the book cover from intentional bending or otherwise being damaged. As already mentioned above, the first layer a) may take the form of a security form bonded by a layer b) in the form of a tab to a book cover of an identification or security document.

The copolyesters may also contain additives customary for polymers or plastics. Examples of typical additives are lubricants, such as fatty acid esters, metal soaps thereof, fatty acid amides and silicone compounds, antiblocking agents, inhibitors, stabilizers against hydrolysis, light, heat and discoloration, flame retardants, dyes, pigments, inorganic or organic fillers, and reinforcers. Reinforcers are especially fibrous reinforcing materials, for example inorganic fibers which are produced according to the prior art and may also have been sized. Further details of the auxiliaries and additives mentioned can be found in the specialist literature, for example J. H. Saunders, K. C. Frisch: "High Polymers", volume XVI, Polyurethanes, parts 1 and 2, Interscience Publishers 1962 and 1964, R. Gächter, H. Müller (eds.): Taschenbuch der Kunststoff-Additive [Handbook of Plastics Additives], 3rd edition, Hanser Verlag, Munich 1989, or DE-A 29 01 774.

The thermoplastic styrene block copolymer (TPE-S) can be any styrene block copolymer that a person skilled in the art would select for a layer structure. The styrene-butylene block copolymers which can preferably be used consist of a polyethylene-butylene rubber middle block with a polystyrene end block chemically coupled at both ends. The polystyrene content is less than 30%. The polystyrene end blocks are uniformly distributed as spherical polystyrene domains in the ethylene rubber matrix. Processes for synthesizing suitable styrene block copolymers are known, for example, from U.S. Pat. Nos. 3,485,787, 4,006,116 and 4,039,629.

The styrene block copolymers can also contain the additives which are customary for polymers or plastics. Examples of typical additives include pigments, stabilizers, flow agents, lubricants and demolding agents.

Examples of styrene block copolymers (TPE-S) are Elastron G, such as Elastron G100 and G101, Elastron D, such as Elastron D100 and D101 from Elastron (Turkey) and Kraton™ D SIBS from Kraton Polymers (USA), Septon™, especially Septon™ Q1250 or Septon™ V9461 from Kuraray (Japan), Styroflex® 2G66 from Ineos Styrolution Group GmbH (Germany), Thermolast® K from Kraiburg TPE (Germany) and Saxomer® TPE-S from PCW GmbH (Germany) Further suitable styrene-butylene block copolymers are available, for example, under the trade names 'Kraton G and 'Elexar from Shell Chemie GmbH.

The thermoplastic, vulcanized (crosslinked) PP/EPDM compound can be any PP/EPDM compound that a person skilled in the art would select for a layer structure. Examples of PP/EPDM compounds are Santoprene (from Exxon Mobil) or Sarlink (from DSM).

Properties and cold flexibility to the material properties of the TPU at. Depending on the organic diisocyanates used, the TPU-Es or TPUs for short may have aliphatic or aromatic character. TPUs typically have a block or segment construction. A basic distinction is made between hard segments and soft segments. Hard segments are formed from the organic diisocyanates used for reaction and short-chain compounds having two to three hydroxyl, amino, thiol or carboxyl groups, preferably compounds having two hydroxyl, amino, thiol or carboxyl groups, more preferably diols, having an average molecular weight of 60 to 500 g/mol. Soft segments are formed from the organic diisocyanates used for reaction and long-chain compounds having two to three hydroxyl, amino, thiol or carboxyl groups, preferably compounds having two hydroxyl, amino, thiol or carboxyl groups, more preferably diols, having an average molecular weight of ≥500 and ≤5000 g/mol.

Hard segments contribute strength and upper use temperatures to the profiles of properties of the TPUs; soft segments contribute elastic properties.

Both for the hard segments and for the soft segments, organic diisocyanates used may be aromatic, aliphatic, araliphatic, heterocyclic and cycloaliphatic diisocyanates or mixtures of these diisocyanates (cf. HOUBEN-WEYL "Methoden der organischen Chemie" [Methods of Organic Chemistry], volume E20 "Makromolekulare Stoffe" [Macromolecular Materials], Georg Thieme Verlag, Stuttgart, New York 1987, pp. 1587-1593 or Justus Liebigs Annalen der Chemie, 562, pages 75 to 136).

Specific examples include: aliphatic diisocyanates such as hexamethylene diisocyanate (HDI), cycloaliphatic diisocyanates such as isophorone diisocyanate (IPDI), cyclohexane 1,4-diisocyanate, 1-methylcyclohexane 2,4-diisocyanate and 1-methylcyclohexane 2,6-diisocyanate and the corresponding isomer mixtures, dicyclohexylmethane 4,4'-diisocyanate, dicyclohexylmethane 2,4'-diisocyanate and dicyclohexylmethane 2,2'-diisocyanate and the corresponding isomer mixtures, aromatic diisocyanates such as tolylene 2,4-diisocyanate, mixtures of tolylene 2,4-diisocyanate and tolylene 2,6-diisocyanate, diphenylmethane 4,4'-diisocyanate, diphenylmethane 2,4'-diisocyanate and diphenylmethane 2,2'-diisocyanate, mixtures of diphenylmethane 2,4'-diisocyanate and diphenylmethane 4,4'-diisocyanate, urethane-modified liquid diphenylmethane 4,4'-diisocyanates and diphenylmethane 2,4'-diisocyanates, 4,4'-diisocyanato-1,2-diphenylethane and naphthylene 1,5-diisocyanate. Preference is given to using hexamethylene 1,6-diisocyanate, isophorone diisocyanate, dicyclohexylmethane 4,4'-diisocyanate, diphenylmethane diisocyanate isomer mixtures having a diphenylmethane 4,4'-diisocyanate content of >96% by weight and especially diphenylmethane 4,4'-diisocyanate and naphthylene 1,5-diisocyanate. These diisocyanates may be used singly or in the form of mixtures with one another. They may also be used together with up to 15% by weight (based on the total amount of diisocyanate) of a polyisocyanate, for example triphenylmethane 4,4',4"-triisocyanate or polyphenylpolymethylene polyisocyanates. Particularly preferred organic diisocyanates are, for example, diphenylmethane 4,4'-diisocyanate, hydrogenated diphenylmethane 4,4'-diisocyanate, toluene 2,4-diisocyanate and hexamethylene diisocyanate.

The preferred short-chain diols having a molecular weight of 60 to 500 g/mol are preferably aliphatic diols having 2 to 14 carbon atoms, for example ethanediol, propane-1,2-diol, propane-1,3-diol, butane-1,4-diol, butane-2,3-diol, pentane-1,5-diol, hexane-1,6-diol, diethylene glycol and dipropylene glycol. Also suitable, however, are diesters of terephthalic acid with glycols having 2 to 4 carbon atoms, for example bis(ethylene glycol) terephthalate or bis(butane-1,4-diol) terephthalate, hydroxyalkylene ethers of hydroquinone, for example 1,4-di(β-hydroxyethyl)hydroquinone, ethoxylated bisphenols, for example 1,4-di(β-hydroxyethyl)bisphenol A, (cyclo)aliphatic diamines, such as isophoronediamine, ethylenediamine, propylene-1,2-diamine, propylene-1,3-diamine, N-methylpropylene-1,3-diamine, N,N'-dimethylethylenediamine and aromatic diamines such as tolylene-2,4-diamine, tolylene-2,6-diamine, 3,5-diethyltolylene-2,4-diamine or 3,5-diethyltolylene-2,6-diamine or primary mono-, di-, tri- or tetraalkyl-substituted 4,4'-diaminodiphenylmethanes. Particular preference is given to using ethanediol, propane-1,2-diol, propane-1,3-diol, butane-1,4-diol, hexane-1,6-diol, ethylene glycol, diethylene glycol, 1,4-di(β-hydroxyethyl)hydroquinone or 1,4-di(β-hydroxyethyl) bisphenol A. It is also possible to use mixtures of the abovementioned compounds. In addition, it is also possible to add relatively small amounts of triols.

The long-chain compounds having two to three hydroxyl, amino, thiol or carboxyl groups, preferably compounds having two hydroxyl, amino, thiol or carboxyl groups, more preferably diols, having a number-average molecular weight of ≥500 and ≤5000 g/mol may be divided into two main groups: polyether diols and polyester diols. The polyether diols are based, for example, on polytetrahydrofuran, polyethylene oxide and polypropylene oxide, and mixtures thereof. The polyester diols are typically based on adipates, for example butane-1,4-diol adipate and hexane-1,6-diol adipate and caprolactone. Cocondensates are likewise possible.

In the preparation of the TPU, it is possible to use catalysts that are customary and known in the art. These may be tertiary amines, for example triethylamine, dimethylcyclohexylamine, N-methylmorpholine, N,N'-dimethylpiperazine, 2-(dimethylaminoethoxy)ethanol, diazabicyclo[2.2.2]octane and the like and also in particular organic metal compounds such as titanic esters, iron compounds or tin compounds such as tin diacetate, tin dioctoate, tin dilaurate or the dialkyltin salts of aliphatic carboxylic acids, for example dibutyltin diacetate or dibutyltin dilaurate or the like. Preferred catalysts are organic metal compounds, especially titanic esters, iron compounds and tin compounds. The total amount of catalysts in the TPU used is preferably about 0% to 5% by weight, more preferably 0.1% to 2% by weight, based on the total amount of TPU.

In addition, the TPUs may contain auxiliaries and additives up to ≤20% by weight, based on the total amount of TPUs. Typical auxiliaries and additives are pigments, dyes, flame retardants, stabilizers against aging and weathering effects, plasticizers, lubricants and demolding agents, fungistats and bacteriostats and fillers, and mixtures thereof.

Examples of further additives are lubricants, such as fatty acid esters, metal soaps thereof, fatty acid amides, fatty acid ester amides and silicone compounds, antiblocking agents, inhibitors, stabilizers against hydrolysis, light, heat and discoloration, flame retardants, dyes, pigments, inorganic and/or organic fillers, for example polycarbonates, and plasticizers and reinforcers. Reinforcers are especially fibrous reinforcing materials, for example inorganic fibers which are produced according to the prior art and may also have been sized. Further details on the auxiliaries and additives mentioned can be found in the specialist literature, for example in the monograph by J. H. Saunders and K. C. Frisch "High Polymers", volume XVI, Polyurethane [Polyurethanes], parts 1 and 2, Interscience Publishers 1962 and 1964, in "Taschenbuch für Kunststoff-Additive" [Plastics Additives Handbook] by R. Gächter and H. Müller (Hanser Verlag Munich 1990) or in DE-A 29 01 774.

Suitable TPUs are for example available on the market under the trade names Desmopan™ Elastollan™, Pellethane™, Estane™, Morthane™, Elasthane™ or Texin™.

The TPUs of the at least one outer layer a) which can be used with preference or according to the invention can be produced continuously by what is called the extruder process, for example in a multi-screw extruder, or by what is called the belt process. The above-described TPUs, optionally with the above-described auxiliaries and additives, can be dosed simultaneously, i.e. in the one-shot method, or successively, i.e. by a prepolymer method. Particular preference is given to the prepolymer method. The prepolymer here can either be initially charged batchwise or produced continuously in a portion of the extruder or in a separate upstream prepolymer unit, for example a static mixer reactor, e.g. Sulzer mixer.

The at least one further layer b) is preferably in the form of a single-layer or multilayer TPU film and can be produced by melting the TPU granules preferred or according to the invention in a melting extruder and extruding same through a die to give a film in a thickness of ≥20 to ≤1000 μm, preferably of ≥50 to ≤800 μm, more preferably of ≥100 to ≤450 μm.

The at least one further layer b) can be produced by the melt extrusion processes known to a person skilled in the art, the blown extrusion process and/or the cast extrusion process. For this purpose, the corresponding above-described TPU granules of the individual layers are melted in a melting extruder and extruded through a die to give a film in appropriate layer thicknesses.

The material of the at least one further layer b), especially when it is the outer layer, is preferably translucent or transparent; the material of the at least one further layer b) is more preferably transparent.

It is preferably a feature of the layer structure that the color, grain and tactile properties of the exterior layer can be realized individually. In addition, the layer structure after lamination has not only have high bond adhesion but also very good mechanical stabilities with regard to tear resistance and abrasion resistance. These properties are possessed by the layer structure even over a period of several years. Furthermore, the layer structure has a self-closing function after lamination and folding.

Furthermore, the layer structure can preferably emit odors, such as a leather odor, by way of the addition of aromas to the further layer b). The further layer b) preferably includes aromas such as LEATHER WOODY from Drom or SUEDERAL IFF from Ventos in an amount in a range from 0.1% to 1% by weight, preferably in a range from 0.2% to 0.8% by weight, more preferably in a range from 0.3% to 0.7% by weight, based on the total weight of the further layer b).

In a preferred embodiment of the layer structure, the first layer a), and preferably also the further layer b), comprise(s) at least one additive having an absorption maximum in the wavelength range of the focused nonionizing electromagnetic radiation used for the production of the engraving, or wherein the first layer a), and preferably also the further layer b), is/are coated with at least one additive in the form of a coating composition having an absorption maximum in the wavelength range of the focused nonionizing electromagnetic radiation used.

Suitable additives include in principle all laser-sensitive additives, called laser marking additives, i.e. additives composed of an absorber in the wavelength range of the radiation (C) used to create the engraving. The additive preferably comprises at least one or more organic and/or inorganic IR absorbers, preferably inorganic IR absorbers. Such additives and the use thereof in molding compounds are described for example in WO-A 2004/50766 and WO-A 2004/50767 and are commercially available from DSM under the Micabs™ brand name.

The first layer a) or preferably the further layer b), and optionally also further layers c), preferably includes an IR absorber in an amount of ≥0.5% to ≤10% by weight, preferably ≥0.6% to ≤7% by weight, more preferably ≥0.7% to ≤5% by weight, most preferably ≥0.75% to ≤2% by weight, based on the total amount of the respective layer a), b) or c). The further layer b) preferably includes an IR absorber in an amount of ≥0.5% to ≤8% by weight, more preferably ≥0.6% to ≤6% by weight, based on the total amount of the further layer b).

Suitable organic IR absorbers are for example compounds having the highest possible absorption between 700 and 2500 nm (near-infrared=NIR). Suitable infrared absorbers include for example those known from the literature as described by substance class for example in M. Matsuoka, Infrared Absorbing Dyes, Plenum Press, New York, 1990. Particularly suitable are infrared absorbers from the substance classes comprising the azo, azomethine, methine, anthraquinone, indanthrone, pyranthrone, flavanthrone, benzanthrone, phthalocyanine, perylene, dioxazine, thioindigo, isoindoline, isoindolinone, quinacridone, pyrrolopyrrole or quinophthalone pigments as well as metal complexes of azo, azomethine or methine dyes or metal salts of azo compounds. Among these, phthalocyanines and naphthalocyanines are very particularly suitable. On account of their improved solubility in thermoplastics, phthalocyanines and naphthalocyanines having bulky side groups are preferable.

Suitable inorganic IR absorbers are, for example, mixed oxides of metals such as for example phosphorus-containing tin-copper mixed oxides, as described in WO-A 2006/042714 for example, those from the group of borides and/or tungstates and mixtures thereof, preferably at least one or more IR absorbers from the group of borides and/or tungstates and mixtures thereof, more preferably at least one or more IR absorbers from the group of tungstates.

Suitable inorganic IR absorbers from the group of borides are, for example, compounds of the MxBy type (M=La, Ce, Pr, Nd, Tb, Dy, Ho, Y, Sm, Eu, Er, Tm, Yb, Lu, Sr, Ti, Zr, Hf, V, Ta, Cr, Mo, W and Ca; and x and y are integers from 1 to 6) where lanthanum hexaboride ($LaB_6$), praseodymium boride ($PrB_6$), neodymium boride ($NdB_6$), cerium boride ($CeB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium boride (CrB and $CrB_2$), molybdenum boride ($MoB_2$, $Mo_2B_5$ and MoB), tungsten boride ($W_2B_5$), or combinations of these borides.

Suitable inorganic IR absorbers from the group of tungstates are, for example, also those from the group of tungsten compounds of the WyOz type (W=tungsten, O=oxygen; z/y=2.20-2.99) and/or MxWyOz (M=H, He, alkali metal, alkaline earth metal, metal from the group of the rare earths, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi; x/y=0.001-1.000; z/y=2.2-3.0), wherein elements preferred as M are H, Cs, Rb, K, Tl, In, Ba, Li, Ca, Sr, Fe and Sn, among which very particular preference is given to Cs. Particular preference is given to $Ba_{0.33}WO_3$, $Tl_{0.33}WO_3$, $K_{0.33}WO_3$, $Rb_{0.33}WO_3$, $Cs_{0.33}WO_3$, $Na_{0.33}WO_3$, $Na_{0.75}WO_3$, and mixtures thereof. In a particular embodiment of the present invention, the sole use of $Cs_{0.33}WO_3$ as inorganic IR absorber is very particularly preferred. Likewise preferred are Cs/W ratios of 0.20 and 0.25.

Among the inorganic IR absorbers, the tungstates are preferable over the borides on account of their low inherent color, especially on layers, preferably on layer a), having a transparency to radiation of ≥10% to ≤99%, preferably of ≥30% to ≤95%, more preferably ≥40% to ≤93%, for the chosen radiation, determined by the UV-VIS-NIR-MIR method as described in the methods section.

Such tungstates are prepared by mixing, for example, tungsten trioxide, tungsten dioxide, a hydrate of a tungsten oxide, tungsten hexachloride, ammonium tungstate or tungstic acid and optionally further salts containing the element M, for example cesium carbonate, in particular stoichiometric ratios such that the molar ratios of the individual components are given by the formula MxWyOz. This mixture is subsequently treated in a reducing atmosphere, for example an argon-hydrogen atmosphere, at temperatures between 100 and 850° C. and finally the obtained powder is heat-treated in an inert gas atmosphere at temperatures between 550 and 1200° C. The inorganic IR absorber nanoparticles of the invention may be produced by mixing the IR absorber with the dispersants described hereinbelow and further organic solvents, for example toluene, benzene or similar aromatic hydrocarbons, and grinding in suitable mills, for example ball mills, with addition of zirconium oxide (for example having a diameter of 0.3 mm) to produce the desired particle size distribution. The nanoparticles are obtained in the form of a dispersion. After grinding, it is optionally possible to add further dispersants. The solvent is removed at elevated temperatures and reduced pressure. Preference is given to nanoparticles having an average size smaller than 200 nm, more preferably smaller than 100 nm. The size of the particles can be determined with the aid of transmission electron microscopy (TEM). Measurements of this kind on IR absorber nanoparticles are described, for example, in Adachi et al., J. Am. Ceram. Soc. 2008, 91, 2897-2902.

Production of the tungstates described is more particularly described, for example, in EP-A 1 801 815 and said tungstates are commercially available, for example, from Sumitomo Metal Mining Co., Ltd. (Japan) under the YMDS 874 name.

For example, for the use thereof in layer structures having at least one first layer a) comprising transparent polymers, especially transparent thermoplastics, having a transparency to radiation for the selected radiation of ≥10% to ≤99%, preferably ≥30% to ≤95%, more preferably ≥40% to ≤93%, determined by the UV-VIS-NIR-MIR method as described in the methods section, the particles thus obtained are dispersed in an organic matrix, for example in an acrylate, and optionally ground as described above in a mill using suitable auxiliaries, for example zirconium dioxide, and optionally using organic solvents, for example toluene, benzene or similar hydrocarbons.

Suitable polymer-based dispersants are, in particular, dispersants having high transmittance, for example polyacrylates, polyurethanes, polyethers, polyesters or polyesterurethanes and polymers derived therefrom.

Preferred dispersants are polyacrylates, polyethers and polyester-based polymers, and particularly preferred dispersants of high thermal stability are polyacrylates, for example polymethylmethacrylate, and polyesters. It is also possible to use mixtures of these polymers or else copolymers based on acrylate. Dispersing auxiliaries of this kind and methods for production of tungstate dispersions are described, for example, in JP 2008214596 and in Adachi et al. J. Am. Ceram. Soc. 2007, 90 4059-4061. Suitable dispersants are commercially available.

Polyacrylate-based dispersants in particular are suitable. Such suitable dispersants are available, for example, from Ciba Specialty Chemicals under the EFKA™ trade names, for example EFKA™ 4500 and EFKA™ 4530. Polyester-containing dispersants are likewise suitable. They are available from Avecia, for example, under the Solsperse™ trade name, e.g. Solsperse™ 22000, 24000SC, 26000, 27000. Also known are polyether-containing dispersants, for example under the Disparlon™ DA234 and DA325 trade names from Kusumoto Chemicals. Polyurethane-based systems are also suitable. Polyurethane-based systems are available from Ciba Specialty Chemicals under the EFKA™ 4046, EFKA™ 4047 trade names. Texaphor™ P60 and P63 are corresponding trade names from Cognis.

The additive preferably comprises at least one or more organic and/or inorganic IR absorbers. The additive is preferably incorporated into the polymeric material in the first layer a) or the further layer b), and further layers c), if present, via a dispersant such as an organic solvent. The amount of the IR absorber in the dispersant may be 0.2% to 50% by weight, preferably 1.0% to 40.0% by weight, more preferably 5.0% to 35% by weight, most preferably 10% to 30% by weight, based on the dispersion of the inorganic IR absorber used in each case. The overall composition of the ready-to-use IR absorber formulation may include, as well as the pure IR absorber material and the dispersant, further auxiliaries, for example zirconium dioxide, and residual solvents, for example toluene, benzene or similar aromatic hydrocarbons. The IR absorber is preferably used in solid form.

There are no limitations whatsoever with regard to the amount of the inorganic IR absorbers, more preferably those from the group of tungstates, in the polymer compositions of the layer structures. Typically, the inorganic IR absorbers, especially the tungstates, may be used in an amount of ≥0.5% by weight to ≤10% by weight, preferably ≥0.6% by weight to ≤2% by weight and more preferably ≥0.7% by weight to ≤1.5% by weight, calculated as the solids content of inorganic IR absorber, in the overall polymer composition of the respective layer, such as layer a) or layer b). The further layer b) preferably includes an inorganic IR absorber in an amount of ≥0.5% to ≤10% by weight, preferably ≥0.6% to ≤7% by weight, more preferably ≥0.7% to ≤5% by weight, most preferably ≥0.75% to ≤2% by weight, based on the total amount of the further layer b).

In the present context, the term "solids content of inorganic IR absorber", especially tungstate, means the inorganic IR absorber, especially the tungstate, as a pure substance and not as a dispersion, suspension or other preparation containing the pure substance, where the contents of IR absorber as additive, especially the tungstate content, reported hereinafter always relate to this solids content unless explicitly stated otherwise.

With preference, further IR absorbers may optionally be used in addition to the tungstates as IR absorbers, where the proportion in terms of the amount thereof in such a mixture is always below that of the above-described tungstates. In the case of mixtures, preference is given to compositions containing two to five (inclusive) and particular preference to two or three different IR absorbers. The further IR absorber is preferably selected from the group of borides and tin oxides, especially $LaB_6$ or antimony-doped tin oxide or indium tin oxide.

In a preferred embodiment of the layer structure, the portion of the engraving on the further layer b) is different in terms of color or structure, especially in terms of color, than the portion of the engraving on the first layer a).

The portion of the engraving on the further layer b) preferably differs in color from the portion of the engraving on the first layer a). More preferably, the portion of the engraving on the further layer b), i.e. the further part-engraving, has a color selected from the group consisting of white, black, red, yellow, blue, or a mixture of at least two of these colors. Preferably, the part of the engraving on the first layer a), i.e. the first part-engraving, has a gray or black color. However, the first part-engraving may likewise be colored, and is preferably blue, yellow or red in color. The part of the engraving on the further layer b) preferably has a white or translucent milky colour, also referred to later on as cloudy. Preferably, this white or translucent milky color covers all the structures beneath the engraving, i.e. including colored or black structures.

The structural difference in the part of the engraving on the further layer b) from the part of the engraving on the first layer a) is preferably selected from the group consisting of the width of the engraving, the depth of the engraving, the sharpness of the engraving, or a combination of at least two of these. The engraving on the first layer a) is preferably narrower than the engraving on the further layer b). The difference in width of the engraving on the first layer a) from the engraving on layer b) is within a range from 1% to 100%, more preferably within a range from 2% to 80%, especially preferably within a range from 5% to 50%, most preferably within a range from 10% to 40%, based on the width of the engraving on the first layer a).

In a preferred embodiment of the layer structure, the portion of the coherent engraving incorporated exclusively on the first layer a) has a colored or black character, preferably a black character. Most preferably, the portion of the coherent engraving incorporated exclusively on the first layer a) is black, including any brightness level of black, i.e. including all grey shades from light gray to black.

In a preferred embodiment of the layer structure, the portion of the engraving that extends within the overlap region and is incorporated into the further layer b), the further part-engraving, is characterized by a colorless altered structure of the polymeric material. The altered structure preferably has a cloudy or milky appearance. The regions of the layer structure, especially the engraving on the further layer b), that include the altered structure have a turbidity of ≥20%, preferably ≥50%, more preferably of ≥80%, measured with a BYK-Gardner haze gard plus instrument in accordance with standard ASTM D1003:2013. It is assumed that this colorless altered structure in the further layer b), also referred to hereinafter as cloudy engraving, arises because the polymeric material incorporates air at the sites heated by the radiation, which refracts naturally incident light differently than the sites of the further layer b) in the unengraved region.

In a preferred embodiment of the layer structure, the further layer b) at the sites with the altered structure has a layer thickness at least ≥0.001 mm, more preferably ≥0.005 mm, especially preferably ≥0.01 mm, thicker than at the points without altered structure.

In a preferred embodiment of the layer structure, the first layer a) is joined to the further layer b) via a join zone at least at the points in the engraving within the overlap region. The join zone is understood to mean the part of the layer structure that results from the fusion of the materials of the first layer a) to the further layer b) by the engraving. The engraving, preferably the laser engraving, in the overlap region joins or welds the materials of the first layer a) and of the further layer b) to one another in the region of the join zone such that they cannot be separated from one another without tearing the join zone. The welding inextricably fuses the materials of the first layer a) at least partly to the material of the further layer b) in the region where they come into contact by virtue of the engraving.

In a preferred embodiment of the layer structure, removal of the further layer b) from the first layer a) separates the coherent engraving at least in the overlap region. The first layer a) and the further layer b) are joined to one another in the overlap region in the join zone at least at the points within the engraving such that they are separable from one another only with a force of at least 1 N/cm at a peel angle of 90°, in accordance with standard DIN 11339:2010-06. Attempting to separate the two layers a) and b) from one another also causes a separation of the continuous engraving in the regions of the overlap region and of the part-engraving atop the overlap region on the first layer a). In the separation of layers a) and b) in the overlap region, the part-engravings, i.e. the first part-engraving and the further part-engraving, are separated such that only the first part-engraving remains on the first layer a) and the further part-engraving on the further layer b). There is no viable way of joining the removed piece of the first layer a) containing the first part-engraving with a further layer b) containing a different part-engraving than the original further layer b) to obtain a sensible joined engraving. Thus, it is not possible to separate a security form of a travel passport represented by the first layer a) from the book cover at this intended breakage site between the first layer a) and the further layer b), in order to join it to a different book cover via a different further layer b). Conversely, the further part-engraving removed on the further layer b) cannot viably be joined to any other first part-engraving of a different first layer a) in order to result in a meaningful engraving. This can prevent forgery of security documents, such as travel passports, as is typically done by exchanging book covers or parts of the security form in attempted forgeries. The separation can also destroy at least one of the layers, either the first layer a) or the further layer b), or the entire engraving.

The separation of the two layers a) and b), especially by removing the further layer b) from the first layer a), in the overlap region, especially in the join zone, preferably alters the structure of the engraving such that it cannot be reassembled such that the engraving results in the original structure, i.e. the original appearance before removal of the further layer b) from the first layer a). This means that the engraving, after the removal of the further layer b) from the first layer a), is no longer coherent or continuous. On removal of the further layer b) from the first layer a), it is preferable that the engraving on the first layer a) not within the overlap region remains intact. What is meant more particularly by intact is that the shape, depth, width and sharpness, and the color, is unchanged compared to the state prior to the removal of the further layer b).

In a preferred embodiment of the layer structure, the portion of the engraving within the overlap region is readable only atop the further layer b). The engraving preferably extends only into the further layer b) in the overlap region. The engraving preferably extends into the further layer b) in the overlap region to an extent of ≤99%, further preferably to an extent of ≤90%, more preferably to an extent of ≤80%, especially preferably to an extent of ≤70%, most preferably to an extent of ≤50%, based on the thickness of the further layer b). The engraving, i.e. the further part-engraving, preferably does not extend into the first layer a) in the overlap region. If the engraving should project into the first layer a) in the overlap region, the further part-engraving preferably has a different color than the first layer a) outside the overlap region.

In a preferred embodiment of the layer structure, the first layer a) comprises at least one dye and/or at least one pigment. The layer structure or the first layer a) preferably additionally comprises a print layer applied over the full area and/or part of the area.

The layer structure or the first layer a) preferably includes the pigment in a concentration of 5 to 1000 ppm, more preferably of 10 to 800 ppm, especially preferably of 15 to 500 ppm.

Preferably, the first layer a) includes at least one thermoplastic and/or at least one black pigment, preferably carbon black.

In a preferred embodiment of the layer structure, the further layer b) has a thickness within a range from ≥20 to ≤1000 μm, preferably from ≥50 to ≤800 μm, more preferably from ≥100 to ≤450 μm. The first layer a) preferably has a thickness within a range from ≥20 to ≤1000 μm, preferably from ≥50 to ≤800 μm, more preferably from ≥100 to ≤450 μm. Preferably, all layers a), b) and c) have a thickness within a range from ≥20 to ≤1000 μm, preferably from ≥50 to ≤800 μm, more preferably from ≥100 to ≤450 μm.

In a preferred embodiment of the layer structure, the further layer b) comprises at least one thermoplastic polyurethane. Examples of preferred polyurethanes have already been mentioned above in connection with usable TPU. More preferably, the polyurethane has been prepared from the following components: a linear polyol, especially a diol, such as polyester diols, polyether diols or polycarbonate diols, and an organic diisocyanate, especially an aliphatic diisocyanate, preferably HDI or IPDI, and short-chain, usually difunctional, alcohols (chain extenders). Examples of difunctional alcohols have already been described above in connection with the description of TPU and should be used here with particular preference.

The invention further relates to a method of producing a layer structure having a join zone, including at least the steps of:

I) providing a first layer a) comprising at least one material which is laser-engravable;
II) at least partly covering the first layer a) with at least a portion of a further layer b) comprising at least one polymeric material, preferably a thermoplastic polyurethane, to form an overlap region of the further layer b) atop the first layer a);
III) producing an engraving, preferably a laser engraving, in the layer structure, wherein a portion of the engraving, also called first part-engraving, is present on a portion of the first layer a) which is not covered by the layer b) and a further portion of the engraving, also called further part-engraving, is present at least on a portion of the layer b) and optionally on a portion of the first layer a) which is covered by the further layer b), to form a join zone,
wherein the two layers a) and b) bond inextricably to one another in the join zone.

The first layer a) may be formed of any material which is radiation-engravable, especially laser-engravable. What is meant by radiation-engravable first layer a) in the context of the invention is that the layer includes a material that interacts with light within a wavelength range of ≥0.1 to ≤1000 μm, preferably of ≥1.0 to ≤50 μm, more preferably of ≥1.0 to ≤2.5 μm, such that irradiation with light having sufficient energy in this wavelength range results in a change in color. This change in color may be created in different ways:

S1. either by means of radiation-sensitive materials within the first layer a), the color of which is changed by irradiation in the abovementioned wavelength range, or
S2. in that the first layer a) is contacted with a colorant that penetrates into the first layer a) on irradiation of the first layer a) within the abovementioned wavelength range and hence creates a change in color in the first layer a), or
S3. by carbonization of the polymeric material in the first layer a) itself.

In variant S1, it is possible, for example, to use an IR absorber as already described above for the layer structure of the invention. Alternatively or additionally to the IR absorber, it is possible to use carbon black. Preference is given to using carbon black. Preferably, carbon black is in an amount within a range from 0.1% to 10%, more preferably within a range from 0.2% to 8% by weight, especially preferably within a range from 0.5% to 6%, most preferably within a range from 1% to 5%, based on the total mass of the first layer a).

Variant S2, when a colored engraving is desired on or in the first layer a), is preferably undertaken in addition to one of steps S1. and S3.

Carbonization constitutes a change in the structure of the polymers via the energy input of the laser radiation. The procedure in order to create a black or gray laser engraving is preferably as follows: By varying the frequency of the laser beam used, it is possible to adjust the engraving on layer a) in gray shades. In the case of low frequencies, the pulse duration is long enough to enable carbonization in the layer in the case of organic materials, which constitutes variant S3. This causes the engraving to appear in a dark color. This is accomplished at frequencies of less than 30 kHz, with a laser having a nominal power of 60 watts. In the case of frequencies over and above 30 kHz, the pulse duration is particularly short. This makes a structural alteration in the material visible and perceptible, and there is only limited carbonization in the case of organic materials. This means that the engraving has a gray to white appearance. The laser engraving is preferably created with a laser that emits at a wavelength of 950 to 1500 nm, preferably at a wavelength of 1064 nm. Preference is given to using a diode laser. A diode laser can be used to achieve particularly short pulse durations, in order to create high energy peaks. It is thus possible, in the further layer b) to produce a particularly clear and light-colored part-engraving which preferably appears as a dark part-engraving in the portion in the adjoining first layer a) that does not form part of the overlap region.

The polymeric material of the first layer a) or of the further layer b) is preferably selected from the materials for these layers as described in association with the layer structure of the invention. For avoidance of repetitions, reference is made hereinafter to the above details relating to the polymeric material with regard to preferred embodiments, materials, amounts, composition and additives as in connection with the layer structure of the invention, which are likewise employed here.

The engraving is preferably produced in step III) by irradiating the layer structure with focused nonionizing electromagnetic radiation. The irradiation in step III) is preferably effected with laser radiation with a wavelength in the range from ≥0.1 μm to ≤1000 μm, preferably from ≥1.0 μm to ≤50 μm, more preferably from ≥1.0 μm to ≤2.5 μm.

If the irradiation is effected by laser, this can be effected in continuous wave operation (CW laser), especially for the engraving of pixel files or gray shade files. Particular preference is given to using pulsed laser radiation for the irradiation of the layer structures or for vector images, or half-tone images. A pulse frequency of 0.5 kHz to 1000 kHz is preferably used; preference is given to using pulse frequencies of 5 kHz to 100 kHz, particular preference to pulse frequencies of 15 kHz to 50 kHz.

By varying the power of the laser beam used for the irradiation in step III), it is possible to influence the intensity of the coloring at the lasered sites according to the demand made on the desired application. The higher the laser output used, the more intense the blackening at the lasered sites of the first layer a), as already mentioned.

The radiation which is used in step III) to create the engraving creates the engraving or the further part-engraving in the overlap region at least on the further layer b). The engraving created in the further layer b) appears as a light-colored engraving. This light-colored engraving arises on account of structural changes in the polymeric material in the further layer b). A variant in order to prevent the part of the first layer a) beneath the further layer b) also being engraved in the overlap region the further layer b) includes an IR absorber. This IR absorber has already been described above in association with the layer structure of the invention, as have the preferred amounts of these that are used. This selection and amount of IR absorber are also applicable to the method described here. The use of the IR absorber can additionally keep the energy input by the radiation source as low as possible in order to arrive at an altered structure of the polymeric material that creates the appearance of the engraving. Since the IR absorber absorbs a portion of the energy of the incident radiation and converts it to heat, which then has the effect that the altered structure of the polymeric material that leads to the colorless cloudy engraving takes place, virtually no further radiation reaches the first layer a) beneath the further layer b) in the overlap region. It is assumed that this cloudy engraving in the further layer b) arises because the polymeric material incorporates air at the sites heated by the radiation, which refracts naturally incident light differently than in the unengraved region. The regions of the layer structure, especially the engraving on the further layer b), that include the altered structure have a turbidity of ≥20%, preferably ≥50%, more preferably of ≥80%, measured with a BYK-Gardner haze gard plus instrument in accordance with standard ASTM D1003:2013.

In order to achieve at least a continuous region of the engraving between the overlap region and the region formed solely by the first layer a), the laser is guided continuously from the region in which solely the first layer a) is present into the overlap region onto the further layer b), or vice versa. Thus, a first part-engraving is formed on the first layer a) outside the overlap region, which is preferably black in color. In addition, a further part-engraving is formed on layer b), which preferably has a cloudy or milky appearance. A join zone is formed here in the overlap region, at the sites that the laser has traversed. As already described above for the layer structure, the two layers a) and b) are inextricably bonded to one another in the join zone. What is meant by "inextricably" is that attempting to separate the two layers a) and b) from one another separates the continuous engraving in the regions of the overlap region and of the part-engraving atop the overlap region on the first layer a). The separation of layers a) and b) in the region of the engraving achieves the effect that each of the two parts that include part of the engraving cannot be viably joined to another part containing a different engraving. Thus, a security form of a travel passport cannot be separated from the book cover at this intended breakage site between the first layer a) and the further layer b) in order to be joined to another security form, as is typically done in attempted forgeries. The separation can also destroy at least one of layer a) and layer b), or the entire engraving. Preferably, one of the materials of the two layers a) and b) is likewise at least partly destroyed, such that it is no longer possible to join layers a) and b) to give a layer structure with an intact engraving.

Preference is given to using an NdYAG laser (neodymium-doped yttrium aluminum garnet laser) in the method for the creation of the engraving in step III). For the color laser engraving of layer structures, it is also possible to use those laser types that are suitable for the engraving and welding of plastics parts, such as layer structures. For example, it is also possible to use a CO2 laser. Preference is given to using a laser that emits at a wavelength of 950 to 1500 nm, preferably at a wavelength of 1064 nm. Preference is given to using a diode laser. A diode laser can be used to achieve particularly short pulse durations, with which high energy peaks can be generated. Thus, it is possible to produce a particularly clear and light-colored part-engraving in the further layer b), which preferably appears as a dark part-engraving in the portion in the adjoining first layer a) that does not form part of the overlap region.

The two superposed layers a) and b) can be irradiated in step III) either from the layer structure side, in which case the radiation first hits the first layer a), or alternatively from the other side, i.e. from the side, in which case the radiation first hits the further layer b). In a preferred embodiment of the method, the superposed layers a) and b) from step II) are irradiated in step III), preferably from the side of the further layer b), in which case the radiation first hits the further layer b). On irradiation in step III), the irradiation may be chosen such that the further part-engraving is present either solely in the further layer b) or at least partly also in the first layer a) beneath the further layer b). If irradiation in the overlap region is effected alternately from the first side a) and from the other side b), what are obtained are alternately black and cloudy regions in the overlap region. In this way, it is preferably possible to introduce patterns into the engraving in the overlap region, which give the appearance of white and black alternating sections.

In a preferred embodiment of the method, at least the first layer a), and preferably also the further layer b), include(s) a thermoplastic selected from the group consisting of polymers of ethylene unsaturated monomers, polycondensates of bifunctional reactive compounds and polyaddition products of bifunctional reactive compounds or combinations of at least two of these. Examples and preferred thermoplastics have been described in connection with the layer structure of the invention and are likewise valid for and applicable to the thermoplastic.

For avoidance of repetition, reference is made hereinafter to the above details relating to the thermoplastic with regard to preferred embodiments, materials, amounts, composition and additives as described in connection with the layer structure of the invention.

The invention further relates to a laminate comprising a layer structure of the invention. The laminate preferably has exactly one first layer a) and one further layer b), including the above-described overlap region of the two layers a) and b), and an engraving, as described in connection with the layer structure of the invention. The laminate, as well as the two layers a) and b) of the layer structure, may include at least one further layer c). The at least one further layer c) preferably includes a polymeric material. Further preferably, the polymeric material of the at least one further layer c) is selected from the group of the materials described for the first layer a) and the materials described further layer b).

The invention further relates to a use of the layer structure of the invention or of the laminate of the invention for production of a security document comprising a security form, preferably a security form in a multilayer book cover, more preferably a security form for security and identification documents. All embodiments, materials, amounts, composition and additives as described in connection with the layer structure of the invention are likewise employable here.

The invention further relates to a method of producing a multilayer laminate, comprising at least the steps of i) providing a layer structure of the invention;

ii) laminating the layer structure from step i) at a temperature of ≥80° C. to ≤220° C., preferably at a temperature of ≥100° C. to ≤200° C., more preferably at a temperature of ≥110° C. to ≤190° C., and with a pressure of ≥2 $N/cm^2$ to ≤500 $N/cm^2$, preferably at a pressure of ≥10 $N/cm^2$ to ≤400 $N/cm^2$, more preferably at a pressure of ≥20 $N/cm^2$ to ≤300 $N/cm^2$, preferably laminating with an engraved lamination plate, more preferably with an engraved lamination plate comprising a non-stick coating;

iii) optionally folding the layer structure, preferably along a centerline of the layer structure, such that the layer structure and laminate are folded symmetrically;

iv) optionally pressing the layer structure after step iii) along the centerline, preferably pressing between two rollers, rolls and/or plates, at a temperature which is ≥0.5° C. to ≤150° C., preferably ≥1° C. to ≤50° C., more preferably ≥1° C. to ≤20° C., above the softening temperature of the outermost layer, for a period of 2 to 20 seconds, preferably of 2 to 10 seconds, more preferably of 2 to 5 seconds;

v) optionally removing the laminate including the layer structure from the press.

The providing in step i) may be any providing of the layer structure that the person skilled in the art would select for the purpose.

High-gloss lamination sheets were used for the laminating in step ii); the laminate thus received high-gloss surfaces on either side and hence had a glass-clear appearance.

For the avoidance of repetition reference is made to what is recited above in respect of the embodiments and preferred ranges of the individual layers of the layer structure.

In another embodiment of the method of the invention, the layer structure, before and/or after the lamination, may be described with a black, white or coloured engraving, as described above by laser radiation at other sites on the layer structure of the laminate.

Methods

Transmittance/transparency to radiation: Transparency to radiation, also called transmittance [%], was measured using a method that took place in the UV-VIS-NIR-MIR spectral region. A UV-VIS-NIR spectrometer from Jasco (V-670) (Japan) was used for the spectral range of ~2600 nm-200 nm. The standard program was chosen here with the following settings, unless stated otherwise: UV/VIS bandwidth 1.0 nm; NIR bandwidth 4.0 nm; scan speed 400 nm/min; lightscore 340 nm; grating/detector 850 nm.

For the spectral range of ~2500 nm-28 000 nm (wavenumber: 350 to 4000 $cm^{-1}$), an FTIR spectrometer from Thermo Fisher Scientific Inc., USA, Nicolet™ iS™10 FT-IR model, was used.

The results in the wavelength range from 200 to 2700 nm are shown in FIG. 5, since this is the spectral region in which the engraving has been incorporated into the layer structure at a later stage by the diode laser at 1064 nm. The following settings were used for the Jasco (V-670) spectrometer:

| | | |
|---|---|---|
| Measurement duration: 95.36 s | Number of transformation points: 16384 | Phase correction: Mertz |
| Resolution: 4.000 | Laser wavenumber: 15798.7 $cm^{-1}$ | Number of background scans: 64 |
| Zero filling: 0 | Peak position in interferogram: 8192 | Background amplification: 2.0 |
| Number of measurement points: 16672 | Apodization: N-B strong | Number of sample scans: 64 |

Spectrometer Description

| | | |
|---|---|---|
| Spectrometer: Nicolet iS10 | Beam divider: KBr | Aperture: open |
| Light source: IR | Laser interval: 1.0000 | Sample amplification: 8.0 |
| Detector: DTGS KBr | ADC bits: 24 | High-pass filter: 20.0000 |
| Smart accessory: 016-01776 | Mirror speed: 0.4747 | Low-pass filter: 11000.0000 |

EXAMPLES

Example 1

Production of a Highly Concentrated IR Masterbatch

Compounding of the masterbatch for the production of a further layer b) in the form of ATP film was effected with a conventional twin-screw compounding extruder at customary TPU processing temperatures of 175° C. to 200° C.

A masterbatch having the following composition was compounded and subsequently pelletized:

92.5% by weight of thermoplastic polyurethane, Elastolan™ 1185A from BASF 7.5% by weight of YMDS 874 IR absorber from Sumitomo (cesium tungsten oxide in toluene).

Example 2

Production of a Type a) Film Type as Further Layer b) Based on TPU

The TPU film was produced by mixing the masterbatch pellets from example 1) with TPU pellets, in the following concentration:

10% by weight of masterbatch

90% by weight of thermoplastic polyurethane, Elastolan™ 1185A from BASF

A film was produced using a blown film extrusion system, in a thickness of 200 μm. Alternatively, such a film can also be extruded through a die in a thickness of 20 to 800 μm by melting the mixture in a melting extruder and extruding it through a die to give a film. Transmittance values for this further layer b) are shown in FIGS. 5 and 6.

Example 3

Production of a Type b) Film Type as Further Layer b) Based on TPU

The TPU film was produced by mixing the masterbatch pellets with TPU pellets, in the following concentration:

20% by weight of masterbatch

80% by weight of thermoplastic polyurethane, Elastolan™ 1185A from BASF

A film was produced using a blown film extrusion system, in a thickness of 200 μm. Alternatively, such a film can also be extruded through a die in a thickness of 20 to 800 μm by melting the mixture in a melting extruder and extruding it through a die to give a film. Transmittance values for this further layer b) are shown in FIGS. 5 and 6.

Example 4

Superposing and Joining the Films from Example 2 or Example 3 on Travel Passport Data Pages Made of Polycarbonate in the Form of a First Layer a) by Vibration Welding The travel passport data pages corresponding to a first layer a) of the layer structure of the invention were produced from polycarbonate films from Covestro. The data pages or the security form were produced in the following structure: 100 μm Makrofol® ID6-2 000000; 100 μm Makrofol® ID6-2 750061; 200 μm Makrofol® ID4-4 010207; 200 μm Makrofol® ID4-4 010207; 100 μm Makrofol® ID6-2 750061; 100 μm Makrofol® ID6-2 000000.

The films were shaped under heat and pressure to give a monolithic composite having a total thickness of 800 μm. The lamination was conducted on a Bürkle 50/100 press. Firstly, the films were pressed in the hot press at a pressure of 60 $N/cm^2$ at 190° C. for 6 minutes; the pressure was finally increased to 200 $N/cm^2$ and maintained for a further 60 seconds. Subsequently, the laminates were cooled down under a pressure of 200 $N/cm^2$, down to a temperature of 35° C., then the laminates were removed from the press. Subsequently, the laminates were cut to the size of a travel passport, about 92 mm×125 mm. Next, a further layer b) in the form of a TPU film from example 2 or 3 was placed onto one of the 125 mm-long sides of the laminate. The overlap region of the TPU film (further layer b) with laminates of polycarbonate (first layer a) had a width of 6 mm. The materials of the first layer a) and the further layer b) were joined to give a layer structure of the invention by heat pulse welding on a WISG instrument from Heinz Schirmacher GmbH. Welding was effected within 4 seconds at a pressure of 2 bar and a temperature of 140° C. The subsequent cooling time lasted for 20 seconds.

Example 5

Superposing and Joining the Films from Example 2) or Example 3) on Travel Passport Data Pages Made of Polycarbonate in the Form of a First Layer a) by Lamination The Travel Passport Data Pages were Produced from Polycarbonate Films from Covestro.

The data pages or the security form were produced in the following layer structure: 100 μm Makrofol® ID6-2 000000; 100 μm Makrofol® ID6-2 750061; 200 μm Makrofol® ID4-4 010207; 200 μm Makrofol® ID4-4 010207; 100 μm Makrofol® ID6-2 750061; 100 μm Makrofol® ID6-2 000000.

The films were shaped under heat and pressure to give a monolithic composite in a total thickness of 800 μm. The lamination was conducted on a Bürkle 50/100 press. Firstly, the films were pressed in the hot press at a pressure of 60 $N/cm^2$ at 190° C. for 6 minutes; the pressure was finally increased to 200 $N/cm^2$ and maintained for a further 60 seconds. Subsequently, the laminates were cooled down under a pressure of 200 $N/cm^2$, down to a temperature of 35° C., then the laminates were removed from the press. Subsequently, the laminates were cut to the size of a travel passport, about 92 mm×125 mm. Next, a further layer b) in the form of a TPU film from example 2 or 3 was placed onto one of the 125 mm-long sides of the laminate. The overlap region of the TPU film (further layer b) with laminates of polycarbonate (first layer a) had a width of 6 mm. The materials of the first layer a) and the further layer b) were joined to give a layer structure of the invention by lamination on a Bürkle 50/100 press. Firstly, the materials were pressed at a pressure of 30 $N/cm^2$ in the hot press at 160° C. for 60 seconds. Subsequently, the materials were cooled down under a pressure of 50 $N/cm^2$, down to a temperature of 35° C., then the laminates were removed from the press. For the laminating, lamination sheets with a nonstick coating were used, in order to prevent the adhesion of the TPU film to the lamination sheet. Lamination sheets from 4-Plate were used, with a nonstick coating from Plascotec.

Example 6

Sealing of the Join Site by Incorporation of an Engraving to Obtain a Join Zone

Figure 1:
FIG. 1 is a diagram of a layer structure in the form of a travel passport with a personalized engraving.
Figure 2:
FIG. 2 is a close-up of the representation of the security document from FIG. 1.

The joined materials from examples 4 and 5, produced with the further layer b) in the form of the TPU film from example 3), were sealed at the join edge by means of laser engraving. In the case of separation of the joined materials of the further layer b) of TPU and the first layer a) of PC, this makes rejoining in an exact manner virtually impossible. It is thus possible to easily identify attempted forgeries of travel passports. For this purpose, the TPU-PC composites were placed on a workpiece carrier of a laser engraving system. A Foba D84S laser engraving system was used. Laser engraving was effected with a current of 30 ampere and a frequency of 8 kHz, at a movement speed of 100 mm/s. Both letters and numbers, as shown in FIGS. 1 and 2, were engraved. The engraving was created parallel to and above the join edge of PC to TPU, in such a way that the upper half of the letters and numbers in the TPU was engraved in the overlap region (further part-engraving) and the lower half in the PC outside the overlap region (first part-engraving). The engraving had a two-color appearance. In the TPU area (further part-engraving), this appeared as a white raised engraving. The engraving in the PC area (first part-engraving) outside the overlap region appeared as a black raised engraving.

Figure 3:
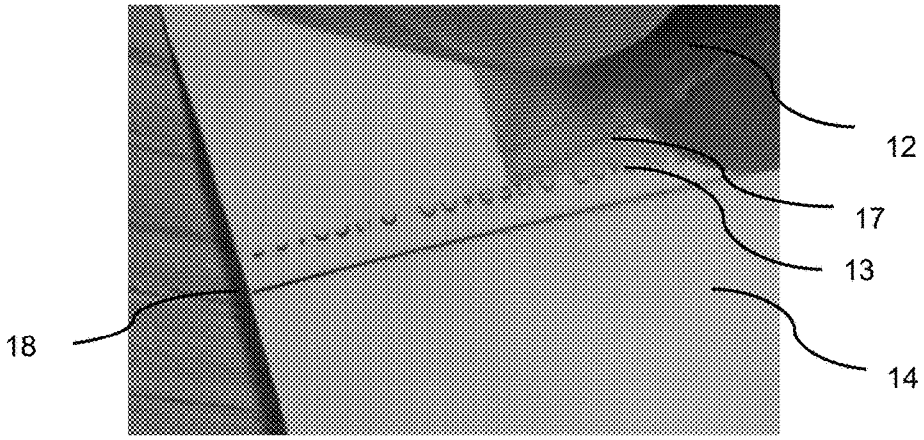
FIG. 3 is a layer structure of the invention, in which the personalized engraving cannot be detached nondestructively.

In an experiment with the aid of tools and heating of the further layer b) in the form of the TPU film, it was possible to remove this from the first layer a) in the form of the PC data page. However, this destroyed the engraved letters and numbers. The engraving in the further layer b), in the TPU area, after removal of the further layer b) of TPU film from the first layer a) in the form of the PC layer, was no longer apparent in the underlying PC film, as can be seen in FIG. 3. Depending on the choice of the amount of IR absorber, it is possible, with the same laser power, to incorporate the further part-engraving only into the further layer b) in the overlap region or else into the underlying first layer a). It is preferable when the further part-engraving is present exclusively on the further layer b).

Example 7

Sealing of the Join Site by Incorporation of an Engraving to Obtain a Join Zone

The joined materials from examples 4 and 5, produced with the further layer b) in the form of the TPU film from example 2), were sealed at the join edge by means of laser engraving to obtain a layer structure of the invention. In the case of separation of the joined materials of the further layer b) of TPU and the first layer a) of PC, this makes rejoining in an exact manner virtually impossible. It is thus possible to easily identify attempted forgeries of travel passports. For this purpose, the TPU-PC composites were placed on a workpiece carrier of a laser engraving system.

A Foba D84S laser engraving system was used, the laser of which works at a wavelength of 1064 nm. Laser engraving was effected with a current of 30 ampere and a frequency of 8 kHz, at a movement speed of 100 mm/s. Letters, as shown in FIGS. 1 and 2, were engraved. The engraving was created parallel to and above the join edge of PC to TPU, in such a way that the upper half of the letters and numbers was engraved into the TPU in the overlap region (further part-engraving) and the lower half in the PC outside the overlap region (first part-engraving). The engraving appeared as a black raised engraving both in the TPU area and in the PC area.

In an experiment with the aid of tools and heating of the further layer of the TPU film, it was possible to remove this from the PC data page. The engraving in the TPU area was also apparent in the underlying PC layer after removal of the TPU film. Forgery is thus virtually ruled out.

Example 8

Production of a Type b) Film Type as Further Layer b) Based on TPU with an Alternative UV Absorber The TPU film was produced with a thermoplastic polyurethane, Elastolan™ 1185A from BASF, on a blown film extrusion system, in a thickness of 200 μm. Alternatively, such a film can also be extruded through a die in a thickness of 20 to 800 μm by melting the thermoplastic polyurethane in a melting extruder and extruding it through a die to give a film. Subsequently, the film was coated with a transparent infrared-absorbing liquid by brush application and dried under air. An infrared-absorbing liquid from Clearweld, LD920C, was used, which contains organic IR-absorbing dyes. Alternatively, the infrared-absorbing liquid from Clearweld, LD920C, can also be incorporated directly into the thermoplastic polyurethane prior to extrusion.

Example 9

Superposing and Joining the Films from Example 8) on Travel Passport Data Pages Made of Polycarbonate in the Form of a First Layer a) by Vibration Welding The travel passport data pages corresponding to a first layer a) of the layer structure of the invention were produced from polycarbonate films from Covestro. The data pages or the security form were produced in the following structure: 100 μm Makrofol® ID6-2 000000; 100 μm Makrofol® ID6-2 750061; 200 μm Makrofol® ID4-4 010207; 200 μm Makrofol® ID4-4 010207; 100 μm Makrofol® ID6-2 750061; 100 μm Makrofol® ID6-2 000000.

The films were shaped under heat and pressure to give a monolithic composite having a total thickness of 800 μm. The lamination was conducted on a Bürkle 50/100 press. Firstly, the films were pressed in the hot press at a pressure of 60 $N/cm^2$ at 190° C. for 6 minutes, then the pressure was increased to 200 $N/cm^2$ and maintained for a further 60 seconds. Subsequently, the laminates were cooled down under a pressure of 200 $N/cm^2$, down to a temperature of 35° C., then the laminates were removed from the press. Subsequently, the laminates were cut to the size of a travel passport, about 92 mm×125 mm. Next, a further layer b) in the form of a TPU film from example 8 was placed onto one of the 125 mm-long sides of the laminate. The overlap region of the TPU film (further layer b) with laminates of polycarbonate (first layer a) had a width of 6 mm. The materials of the first layer a) and the further layer b) were joined to give a layer structure of the invention by heat pulse welding on a WISG instrument from Heinz Schirmacher GmbH. Welding was effected within 4 seconds at a pressure of 2 bar and a temperature of 140° C. The subsequent cooling time lasted for 20 seconds.

Example 10

Sealing of the Join Site by Incorporation of an Engraving to Obtain a Join Zone

The joined materials from examples 8 and 9, produced with the further layer b) in the form of the TPU film from example 8), were sealed at the join edge by means of laser engraving to obtain a layer structure of the invention. In the case of separation of the joined materials of the further layer b) of TPU and the first layer a) of PC, this makes rejoining in an exact manner virtually impossible. It is thus possible to easily identify attempted forgeries of travel passports. For this purpose, the TPU-PC composites were placed on a workpiece carrier of a laser engraving system. A Trumpf 3130 laser engraving system was used, the laser of which works at a wavelength of 1064 nm. Laser engraving was effected with a power of 80% and a frequency of 12 kHz, at a movement speed of 400 mm/s. Both letters and numbers, as shown in FIG. 6, were engraved. The engraving was created parallel to and above the join edge of PC to TPU, in such a way that the upper half of the letters and numbers in the TPU was engraved in the overlap region (further part-engraving) and the lower half in the PC outside the overlap region (first part-engraving). The engraving had a two-color appearance. In the TPU area (further part-engraving), this appeared as a white raised engraving. The engraving in the PC area (first part-engraving) outside the overlap region appeared as a black raised engraving.

FIGURES

Figure 4A:
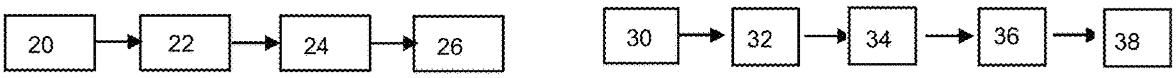

FIGS. 1-4 describe preferred embodiments for the layer structure and the method of production thereof, which should not be interpreted in a limiting manner. The figures show:

FIG. 1: a diagram of a layer structure in the form of a travel passport with a personalized engraving on the first layer a) in black and on the further layer b) in the overlap region in milky to white;

FIG. 2: a close-up of the representation of the security document from FIG. 1 in the form of a travel passport with a personalized engraving on the first layer a) in black (first part-engraving) and on the further layer b) in the overlap region in cloudy to white (further part-engraving);

FIG. 3: a layer structure of the invention, in which the personalized engraving cannot be detached nondestructively;

FIG. 4*a*: a schematic diagram of the method of producing a layer structure of the invention with join zone;

FIG. 4*b*: a schematic diagram of the method of producing a multilayer laminate comprising the layer structure of the invention;

FIG. 5: a diagram of the transmittance values of two further layers b) from examples 2) and 3) with different proportions of IR absorber in the wavelength range of 200 to 2700 nm.

FIG. 1 shows a layer structure 10 of the invention in the form of a travel passport, which represents a security document. The layer structure 10 was produced according to example 7. The layer structure 10 includes at least one first layer a) 14 consisting of a polycarbonate, and a further layer b) 12 consisting of a thermoplastic polyurethane. The further layer b) 12 overlaps in the overlap region 17 with the first layer a) 14. In addition, multiple coherent engravings 13, each consisting of a white or almost transparent portion 16 and a black portion 18, are present in the layer structure 10. The white portion of the engraving 16 is in the overlap region 17, and the black portion of the engraving 18 is exclusively on the first layer a) 14. The two portions 16 and 18 of the engraving are joined to one another by a join zone in which the black portion of the engraving, namely the first part-engraving 18, directly adjoins the cloudy or white part of the engraving, the further part-engraving 16.

FIG. 2 is an enlargement of the middle portion of the layer structure 10 from FIG. 1. The overlap region 17 and the engraving 13 with their part-regions of the further part-engraving 16 on the further layer b) 12 and of the black part-engraving 18 on the first layer a) 14 are readily apparent.

FIG. 3 shows an attempted forgery on a layer structure of the invention, as shown in FIG. 2, produced according to example 6. It is apparent that the coherent engraving 13 cannot be separated in such a way as to enable re-establishment of the engraving 13 or reading on one of the layers, layer a) 14 or layer b) 12. There is thus no possibility of nondestructive detachment of the further layer b) 12 from the first layer a) 14. From the remaining part-engraving 18, it is possible only with difficulty, if at all, to deduce the information given in the coherent engraving 13 before the further layer b) 12 was pulled away.

FIG. 4*a* shows a schematic of the method of producing a layer structure 10 with a join zone. In step I) 20, the first layer a) was provided. In step II) 22, the first layer a) was at least partly covered by the further layer b), and they were laminated together by lamination on a Bürkle 50/100 press. The materials of the first layer a) and the further layer b) were compressed at least in the overlap region in the press mentioned at 160° C. for 60 seconds at a pressure of 30 N/cm. Subsequently, the materials were cooled down under a pressure of 50 N/cm$^2$, down to a temperature of 35° C. Then the laminates were removed from the press. For the laminating, lamination sheets with a nonstick coating were used, in order to prevent the adhesion of the TPU film to the lamination sheet. Lamination sheets from 4-Plate were used, with a nonstick coating from Plascotec. In step III) 24, the engraving was produced by means of a laser both in the overlap region of layers a) and b) to form a join zone and in the portion of the first layer a) not covered by the further layer b).

FIG. 4*b* shows a schematic of the method of producing a multilayer laminate. In step i) 30, the layer structure 10 of the invention was provided. In step ii) 32, the layer structure 10 from step i) 30 was laminated at a temperature of 180° C. and a pressure of 100 N/cm$^2$ in a commercial press, as described above in association with FIG. 4*a*. In step iii) 34, which is optional, the laminated layer structure 10 from step ii) 32 was folded along a line that runs along the middle of the layer structure 10. In step iv) 36, which is optional, the layer structure 10 from step iii) 34 was pressed between two rolls at a temperature of 250° C. for 5 seconds. Subsequently, the laminate was removed from the press in step v) 38.

Plotted in FIG. 5 are the transmittance values of the further layers b) from examples 2) and 3) within the wavelength range of 200 to 2700 nm, as measured by the test method as described above. Unexpectedly, there was not a linear but a much more significant decrease in transmittance at the wavelength of 1064 nm, at which the engraving 13 is incorporated into the layer structure 10. Thus, when the IR absorber concentration was doubled, from 0.75% by weight in example 2) to 1.5% by weight in example 3), the decrease in transmittance was not by half but to ⅓, namely from 45% to 15%.

FIG. 6 shows a layer structure 10 of the invention in the form of a travel passport, which represents a security document. The layer structure 10 was produced according to example 10. The layer structure 10 includes at least one first layer a) 14 consisting of a polycarbonate, and a further layer b) 12 consisting of a thermoplastic polyurethane. The first layer a) 14 overlaps in the overlap region 17 with the further layer b) 12. In addition, there are multiple coherent engravings 13 which consist at least partly of a white or almost transparent portion 16 and a black portion 18, partly on the first layer a) 14 and partly on the further layer b) 12. The white portion of the engraving 16 is on the further layer b) 12, and the black portion of the engraving 18 is in the overlap region 17 on the first layer a) 14. The two portions 16 and 18 of the engraving are joined to one another by a join zone in which the black portion of the engraving, namely the first part-engraving 18, directly adjoins the cloudy or white part of the engraving, the further part-engraving 16.

The invention claimed is:

1. A layer structure, comprising a hinge formed between a security form and a book cover of an identification or security document, comprising at least a) a first radiation-engravable layer a) comprising at least one polymeric material; and b) at least one further layer b) comprising a thermoplastic polyurethane, having a Shore A hardness of ≥40 to DIN ISO 7619-1-2012-2 up to a Shore D hardness of ≤95 to DIN ISO 7619-1-2012-2;

wherein the at least one further layer b) partly covers the first radiation-engravable layer a) to form an overlap region, wherein a coherent engraving partly extends in the overlap region, and partly in the portion of layer a) that extends outside the overlap region, and wherein the portion of the engraving that extends within the overlap region and is incorporated into the at least one further layer b) is characterized by a colorless altered structure of the thermoplastic polyurethane, wherein the colorless altered structure has a cloudy or milky appearance and a turbidity of ≥20%, measured with a BYK-Gardner haze gard plus instrument in accordance with standard ASTM D1003:2013.

2. The layer structure as claimed in claim 1, wherein at least one of the first layer a), and the at least one further layer b), further comprise at least one additive having an absorption maximum in the wavelength range of the focused nonionizing electromagnetic radiation used for the production of the engraving, or wherein at least one of the first layer a), and the at least one further layer b), is coated with at least one additive in the form of a coating composition having an absorption maximum in the wavelength range of the focused nonionizing electromagnetic radiation used.

3. The layer structure as claimed in claim 1, wherein the at least one further layer b) contains an IR absorber having a transmittance of light of ≤20% in the wavelength range of 950 to 1200 nm, in an amount of ≥0.5% to ≤10% by weight, based on the total amount of layer b).

4. The layer structure as claimed in claim 1, wherein the portion of the engraving on the at least one further layer b) is different in terms of color or structure than the portion of the engraving on the first layer a).

5. The layer structure as claimed in claim 1, wherein the portion of the coherent engraving incorporated on the first layer a) has a colored or black character.

6. The layer structure as claimed in claim 1, wherein removal of the at least one further layer b) from the first layer a) separates the coherent engraving at least in the overlap region.

7. The layer structure as claimed in claim 1, wherein the portion of the engraving within the overlap region is readable only atop the at least one further layer b).

8. The layer structure as claimed in claim 1, wherein the polymeric material of the first layer a) contains a thermoplastic selected from the group consisting of polymers of ethylenically unsaturated monomers, polycondensates of bifunctional reactive compounds, and polyaddition products of bifunctional reactive compounds.

9. The layer structure as claimed in claim 1, wherein the first layer a) comprises at least one selected from the group consisting of a dye and at least one pigment.

10. The layer structure as claimed in claim 1, wherein the at least one further layer b) comprises at least one thermoplastic polyurethane.

11. A laminate comprising a layer structure as claimed in claim 1.

12. The layer structure as claimed in claim 1 for production of a security document.

13. A method of producing a multilayer laminate, comprising at least the steps of i) providing a layer structure as claimed in claim 1 to;

ii) laminating the layer structure from step i) at a temperature of ≥80° C. to ≤220° C. and with a pressure of ≥2 $N/cm^2$ to ≤500 $N/cm^2$, with an engraved lamination plate;

iii) folding the layer structure along a centerline of the layer structure, such that the layer structure and laminate are folded symmetrically;

iv) pressing the layer structure after step iii) along the centerline, between two rollers, rolls and/or plates, at a temperature which is ≥0.5° C. to ≤150° C., above the softening temperature of the outermost layer, for a period of 2 to 20 seconds;

v) removing the laminate including the layer structure from the press.

* * * * *